United States Patent
Kigami et al.

(10) Patent No.: US 10,800,944 B2
(45) Date of Patent: *Oct. 13, 2020

(54) PRESSURE-SENSITIVE ADHESIVE SHEET

(71) Applicant: NITTO DENKO CORPORATION, Osaka (JP)

(72) Inventors: Hiroki Kigami, Osaka (JP); Yasushi Buzojima, Osaka (JP); Kenta Jozuka, Osaka (JP); Midori Segawa, Osaka (JP); Masataka Nishiwaki, Osaka (JP); Ryo Morioka, Osaka (JP)

(73) Assignee: NITTO DENKO CORPORATION, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/671,633

(22) Filed: Aug. 8, 2017

(65) Prior Publication Data

US 2018/0044555 A1  Feb. 15, 2018

Related U.S. Application Data

(60) Provisional application No. 62/456,804, filed on Feb. 9, 2017.

(30) Foreign Application Priority Data

| Aug. 10, 2016 | (JP) | 2016-158052 |
| Feb. 8, 2017 | (JP) | 2017-021411 |
| Jul. 27, 2017 | (JP) | 2017-145425 |

(51) Int. Cl.
*C09J 7/38* (2018.01)
*C09J 7/10* (2018.01)
(Continued)

(52) U.S. Cl.
CPC .................. *C09J 7/00* (2013.01); *B32B 7/06* (2013.01); *B32B 7/12* (2013.01); *C09J 7/10* (2018.01);
(Continued)

(58) Field of Classification Search
CPC ....... C09J 7/00; C09J 7/10; C09J 7/385; C09J 11/06; C09J 2203/318; C09J 2203/326;
(Continued)

(56) References Cited

U.S. PATENT DOCUMENTS

2009/0279168 A1* 11/2009 Hiwatashi ............... C09J 11/06
 359/359
2009/0324868 A1  12/2009 Tamai et al.
(Continued)

FOREIGN PATENT DOCUMENTS

| JP | H07-242863 A | 9/1995 |
| JP | 200499805 A | 4/2004 |

(Continued)

OTHER PUBLICATIONS

Espacenet Machine Translation of WO 2015/145767 A1 (Year: 2015).*

(Continued)

*Primary Examiner* — Scott R. Walshon
(74) *Attorney, Agent, or Firm* — Greenblum & Bernstein, P.L.C.

(57) ABSTRACT

Provided is a pressure-sensitive adhesive (PSA) sheet including a PSA layer formed from a PSA composition including a base polymer, crosslinking agents of two or more species having mutually different types of crosslinkable functional groups, and an azole-based rust inhibitor. Here, one of the crosslinking agents of two or more species is an isocyanate-based crosslinking agent. Monomeric components constituting the base polymer include a carboxy group-containing monomer. The amount of the azole-based (Continued)

rust inhibitor in the PSA layer is less than 8 parts by weight with respect to 100 parts by weight of the base polymer.

19 Claims, 1 Drawing Sheet

(51) Int. Cl.
| | | |
|---|---|---|
| C09J 11/06 | (2006.01) | |
| C08K 5/3475 | (2006.01) | |
| C09J 133/08 | (2006.01) | |
| C09J 7/00 | (2018.01) | |
| B32B 7/06 | (2019.01) | |
| B32B 7/12 | (2006.01) | |
| C09J 9/00 | (2006.01) | |
| C23F 15/00 | (2006.01) | |
| C09J 133/06 | (2006.01) | |

(52) U.S. Cl.
CPC ............... *C09J 7/385* (2018.01); *C09J 9/00* (2013.01); *C09J 11/06* (2013.01); *C23F 15/005* (2013.01); *C08K 5/3475* (2013.01); *C09J 133/066* (2013.01); *C09J 133/08* (2013.01); *C09J 2201/606* (2013.01); *C09J 2201/622* (2013.01); *C09J 2203/318* (2013.01); *C09J 2203/326* (2013.01); *C09J 2205/102* (2013.01); *C09J 2433/00* (2013.01)

(58) Field of Classification Search
CPC .. C09J 133/066; C09J 133/068; C09J 133/08; C09J 133/10; C09J 133/12; C09J 133/14; C09J 133/16; C09J 133/20; C09J 133/26; C09J 2201/606; C09J 2201/622; C09J 2205/102; C23F 15/005; C09D 133/066; C09D 133/068; C09D 133/08; C09D 133/10; C09D 133/12; C09D 133/14; C09D 133/16; C09D 133/20; C09D 133/26; C08L 33/066; C08L 33/068; C08L 33/08; C08L 33/10; C08L 33/12; C08L 33/14; C08L 33/16; C08L 33/20; C08L 33/26

See application file for complete search history.

(56) References Cited

U.S. PATENT DOCUMENTS

| | | | | |
|---|---|---|---|---|
| 2010/0193961 A1* | 8/2010 | Konishi | ............... | C08L 63/00 428/41.7 |
| 2010/0285293 A1 | 11/2010 | Lee et al. | | |
| 2012/0055700 A1* | 3/2012 | Horiguchi | ............... | C09J 133/02 174/254 |
| 2012/0094037 A1* | 4/2012 | Banba | ............... | C09J 133/066 428/1.5 |
| 2012/0157611 A1 | 6/2012 | Katami et al. | | |
| 2012/0214936 A1* | 8/2012 | Fujita | ............... | C09J 133/04 524/548 |
| 2012/0328800 A1* | 12/2012 | Yoon | ............... | C09J 133/062 428/1.55 |
| 2013/0122688 A1 | 5/2013 | Sasaki et al. | | |
| 2013/0142982 A1* | 6/2013 | Horiguchi | ............... | C09J 7/045 428/41.8 |
| 2013/0211028 A1 | 8/2013 | Shinike et al. | | |
| 2013/0244013 A1* | 9/2013 | Nakayama | ............... | C09J 193/00 428/213 |
| 2013/0345333 A1* | 12/2013 | Kim | ............... | C09J 133/14 522/33 |
| 2014/0037952 A1* | 2/2014 | Shigetomi | ............... | C09J 133/08 428/355 AC |
| 2014/0065417 A1* | 3/2014 | Higashi | ............... | C09J 133/066 428/355 AC |
| 2014/0226085 A1 | 8/2014 | Katami et al. | | |
| 2016/0152868 A1 | 6/2016 | Yoon et al. | | |
| 2016/0167339 A1* | 6/2016 | Dollase | ............... | C09J 133/08 428/522 |
| 2017/0158918 A1* | 6/2017 | Jozuka | ............... | C09J 201/00 |
| 2017/0292046 A1 | 10/2017 | Fukuda et al. | | |

FOREIGN PATENT DOCUMENTS

| | | | |
|---|---|---|---|
| JP | 2006-045315 A | 2/2006 | |
| JP | 2008-63561 A | 3/2008 | |
| JP | 2010-079142 A | 4/2010 | |
| JP | 2011-512422 A | 4/2011 | |
| JP | 2011-154700 A | 8/2011 | |
| JP | 2012-046681 A | 3/2012 | |
| JP | 201241456 A | 3/2012 | |
| JP | 2012140605 A | 7/2012 | |
| JP | 2013-021105 A | 1/2013 | |
| JP | 2014-015566 A | 1/2014 | |
| JP | 2014136778 A | 7/2014 | |
| JP | 2014-177611 A | 9/2014 | |
| JP | 2015-178595 A | 10/2015 | |
| JP | 2016-74761 A | 5/2016 | |
| JP | 2016-516858 A | 6/2016 | |
| WO | WO 2008/111412 A1 | 9/2008 | |
| WO | 2012173247 A1 | 12/2012 | |
| WO | WO-2015014582 A1 * | 2/2015 | ............ C09J 133/08 |
| WO | 2015/145767 A1 | 10/2015 | |
| WO | WO 2016/043268 A1 | 3/2016 | |

OTHER PUBLICATIONS

Opposition to the Grant of Patent issued in JP 6205081, dated Mar. 26, 2018, with English translation.
Notice of Reasons for Revocation issued in JP 6205081, dated May 22, 2018, with English translation.
Decision on Opposition issued in JP 6205081, dated Nov. 7, 2018, with English translation.
Oct. 4, 2018 Non-Final Office Action for U.S. Appl. No. 15/671,583.
Jan. 30, 2019 Final Office Action for U.S. Appl. No. 15/671,583.
Office Action for JP App. No. 2016-158053, dated Feb. 27, 2020 (w/ translation).
Office Action for U.S. Appl. No. 15/671,583, dated Jan. 8, 2020.

* cited by examiner

PRESSURE-SENSITIVE ADHESIVE SHEET

CROSS-REFERENCE

This application claims priority based on Japanese Patent Application No. 2016-158052 filed on Aug. 10, 2016, Japanese Patent Application No. 2017-021411 filed on Feb. 8, 2017, U.S. Provisional Patent Application No. 62/456,804 filed on Feb. 9, 2017, and Japanese Patent Application No. 2017-145425 filed on Jul. 27, 2017, and the entire contents of those applications are incorporated herein by reference.

BACKGROUND OF THE INVENTION

Field of the Invention

The present invention relates to a pressure-sensitive adhesive (PSA) sheet.

Description of the Related Art

In general, a PSA exists as a soft solid (a viscoelastic material) in a room temperature range and has a property to adhere easily to an adherend with some pressure applied. With such properties, PSA is widely used as a joining means having high operability and high reliability of adhesion typically in the form of a PSA sheet including a layer of the PSA in various industrial fields such as home appliances, automobiles, various types of machinery, electrical equipment, and electronic equipment. A PSA sheet is also preferably used, for example, for fixing members in mobile electronic devices such as mobile phones, smart phones, and tablet-type personal computers. Technical documents relating to PSA are exemplified by International Patent Publication No. 2015/145767 and Japanese Patent Application Publication Nos. 2011-154700, 2006-045315, and H07-242863.

SUMMARY OF THE INVENTION

The PSA sheet used for a member having a metal surface, for example the PSA sheet for fixing such a member, is desirable to be unlikely to cause corrosion of the metal surface. i.e. the PSA sheet having a metal corrosion prevention property is desirable. A typical conventional method for preventing metal corrosion in the field of PSA sheets involves using a PSA comprising a base polymer with a monomer composition including no carboxy group-containing monomer as a PSA constituting the PSA layer of the PSA sheet. It has also been suggested to add a rust inhibitor such as benzotriazole to a PSA in order to prevent metal corrosion.

However, in the case of fixing members, for example, in mobile electronic devices, the requirements for better durability, longer life, higher safety, and the like, created a demand for member holding performance (that is, the ability to hold a member in a fixed state) that has been growing year by year, and such an increasing demand cannot be met fully with the conventional PSA sheets designed to prevent metal corrosion.

The present invention has been created with the foregoing in view, and it is an object of the present invention to provide a PSA sheet having satisfactory metal corrosion prevention property and excellent member holding performance.

This description provides a PSA sheet including a PSA layer formed from a PSA composition including a base polymer, crosslinking agents of two or more species having mutually different types of crosslinkable functional groups, and an azole-based rust inhibitor. One of the crosslinking agents of two or more species is an isocvanate-based crosslinking agent. Monomeric components constituting the base polymer include a carboxy group-containing monomer. The amount of the azole-based rust inhibitor in the PSA layer is less than 8 parts by weight with respect to 100 parts by weight of the acrylic polymer.

Since the PSA sheet having such a constitution includes a carboxy group-containing monomer in the composition of the monomeric components constituting the base polymer, satisfactory durability against impacts in a shear direction. The durability against impacts in a shear direction, or shear impact resistance hereinafter, can be evaluated, for example, by the impact adhesive strength described later. Further, by using an isocyanate-based crosslinking agent in combination with another crosslinking agent in a composition including an azole-based rust inhibitor, it is possible to realize advantageously both cohesiveness (for example, heat-resistant cohesiveness) and metal corrosion prevention property. As a result, it is possible to realize a PSA sheet which is excellent in metal corrosion prevention property and also in member holding performance.

The art disclosed herein can be preferably implemented in an embodiment in which the PSA layer has a relative dielectric constant of 3 or more at 300 kHz. The PSA layer exhibiting such a relative dielectric constant can be preferably used, for example, for fixing a dielectric-type pressure-sensitive sensor.

In one embodiment, the monomeric components include a (meth)acrylate having a hydrocarbon group having 4 or less carbon atoms at an ester end at 50% by weight or more of the monomeric components. In such a configuration where an acrylic polymer having a monomer composition including a large amount of a monomer with a relatively short alkyl chain is used as a base polymer, a PSA layer having a high dielectric constant tends to be easily obtained. This can be advantageous, for example, in an application for fixing a pressure-sensitive sensor of an electrostatic capacitive type.

In another embodiment, the amount of the carboxy group-containing monomer among the monomeric components is more than 3% by weight. With the monomeric components having such a composition, a PSA layer exhibiting higher shear impact resistance tends to be realized.

The amount of the azole-based rust inhibitor can be, for example, 0.2 part by weight or more and 15 parts by weight or less with respect to 10 parts by weight of the carboxy group-containing monomer. With such a configuration, satisfactory shear impact resistance and heat-resistant cohesiveness, which are due to the use of the carboxy group-containing monomer, and metal corrosion prevention property, which is due to the use of the azole-based rust inhibitor, can be advantageously achieved at the same time.

The PSA layer in the art disclosed herein may include a tackifier resin. By including a tackifier resin in the PSA layer, it is possible to enhance the adhesiveness to the adherend and to improve the member holding performance.

In the PSA sheet according to one embodiment, the tackifier resin included in the PSA layer includes a tackifier resin having a hydroxyl value of 30 mg KOH/g or more. By thus including the tackifier resin having a comparatively high hydroxyl value in the PSA layer, it is possible to enhance the adhesiveness to the adherend and effectively improve the member holding performance. For example, a phenolic tackifier resin such as terpene phenolic resin can be preferably used as the tackifier resin having a hydroxyl value of 30 mg KOH/g or more.

The PSA sheet disclosed herein preferably has a room-temperature peel strength with respect to polyethylene terephthalate (PET) of 15 N/25 mm or more. Such a PSA sheet can exhibit better member holding performance.

From the standpoint of rust prevention effect, a benzotriazole compound of at least one kind selected from the group consisting of 1,2,3-benzotriazole, 5-methylbenzotriazole, 4-methylbenzotriazole, and carboxybenzotriazole can be preferably used as the azole-based rust inhibitor.

Since the PSA sheet disclosed herein excels in metal corrosion prevention property and member holding performance (for example, shear impact resistance), the PSA sheet can be advantageously used for fixing a member in a mobile electronic device. For example, the PSA sheet can be preferably used in an embodiment in which a pressure-sensitive sensor is fixed to another member constituting a mobile electronic device.

DETAILED DESCRIPTION OF THE INVENTION

Figure 1:
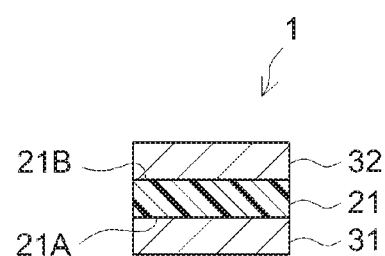
FIG. 1 is a cross-sectional view schematically illustrating one configuration example of a PSA sheet.

Preferred embodiments of the present invention are described below. Matters necessary to practice this invention other than those specifically referred to in this description may be comprehended by a person of ordinary skill in the art based on the instruction regarding implementations of the invention according to this description and the common technical knowledge in the pertinent field. The present invention can be practiced based on the contents disclosed in this description and common technical knowledge in the subject field. In the drawings referenced below, a common reference numeral may be assigned to members or sites producing the same effects, and duplicated descriptions are sometimes omitted or simplified. The embodiments described in the drawings are schematized for clear illustration of the present invention, and do not necessarily represent the accurate sizes or reduction scales of the PSA sheet to be provided as an actual product by the present invention.

As used herein, the term "PSA" refers to, as described earlier, a material that exists as a soft solid (a viscoelastic material) in a room temperature range and has a property to adhere easily to an adherend with some pressure applied. As defined in "Adhesion: Fundamental and Practice" by C. A. Dahlquist (McLaren & Sons (1966), P. 143), PSA referred to herein may generally be a material that has a property satisfying complex tensile modulus $E^*(1\ Hz) < 10^7\ dyne/cm^2$ (typically, a material that exhibits the described characteristics at 25° C.).

As used herein, the term "(meth)acryloyl" is meant to be inclusive of acryloyl and methacryloyl. Likewise, "(meth)acrylate" means acrylate and methacrylate, and "(meth)acryl" is meant to be inclusive of acryl and methacryl respectively.

As used herein, the term "acrylic polymer" refers to a polymerized product including a monomer unit derived from a monomer having at least one (meth)acryloyl group in a molecule as a monomer unit constituting the polymer. Hereinafter, a monomer having at least one (meth)acryloyl group in a molecule can be also referred to as "acrylic monomer". Therefore, the acrylic polymer in this description is defined as a polymer including a monomer unit derived from an acrylic monomer. A typical example of the acrylic polymer is a polymerized product of monomeric components including an acrylic monomer in an amount of more than 50% by weight. In a preferred embodiment, the amount of the acrylic monomer among the monomeric components can be about 70% by weight or more (for example, about 90% by weight or more).

As used herein, the term "crosslinkable functional group" of the crosslinking agent refers to a functional group contained in or derivable from the crosslinking agent and capable of contributing the crosslinking by the crosslinking agent. The crosslinkable functional group may potentially be contained in the crosslinking agent as, for example, a precursor or blocked form of the functional group. A crosslinking agent generally referred to as an isocyanate-based crosslinking agent is a typical example of a crosslinking agent where the crosslinking functional group of which is an isocyanate group. Non-limiting examples of crosslinkable functional groups different from the isocyanate group include epoxy, oxazoline, aziridine, melamine, carbodiimide, hydrazine, amine, and alkoxy silyl groups. A crosslinking agent generally referred to as an epoxy-based crosslinking agent is a typical example of a crosslinking agent where the crosslinking functional group of which is an epoxy group. The same applies to other crosslinkable functional groups.

The PSA sheet disclosed herein is configured to include a PSA layer formed from a PSA composition including a base polymer, a crosslinking agent, and a rust inhibitor. Here, the base polymer refers to a main component of a rubbery polymer (polymer showing rubber elasticity in the room temperature range) contained in the PSA layer. Further, as used herein, the "main component" means a component contained in an amount of more than 50% by weight, unless specifically stated otherwise.

The PSA sheet disclosed herein may be a substrate-supported PSA sheet configured to have the PSA layer provided on one side or each side of a non-releasable substrate (support substrate). Alternatively, the PSA sheet disclosed herein may be a substrate-free PSA sheet, for example, of the form in which the PSA sheet is held on a release liner (that is, a PSA sheet not including a non-releasable substrate). The concept of PSA sheet herein encompasses so-called PSA tapes, PSA labels, PSA films and the like. The PSA sheet disclosed herein may be in a wounded roll form or in a flat sheet form. The PSA sheet may be further processed into various shapes.

Figure 2:
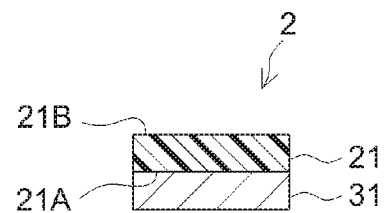
FIG. 2 is a cross-sectional view schematically illustrating another configuration example of the PSA sheet.

An example of the configuration of a double-faced substrate-free PSA sheet (substrate-free double-faced PSA sheet) is shown in FIGS. 1 and 2. A PSA sheet 1 shown in FIG. 1 has a configuration in which each surface 21A and 21B of a substrate-free PSA layer 21 is protected by release liners 31 and 32 having a release surface at least on the PSA layer side. In a PSA sheet 2 shown in FIG. 2, one surface (adhesive face) 21A of the substrate-free PSA layer 21 is protected by the release liner 31 in which each surface is a release surface. When such a PSA sheet is wound, the other surface (adhesive face) 21B of the PSA layer 21 is brought into contact with the back surface of the release liner 31 so that the other surface 21B is also protected by the release liner 31. From the standpoint of reducing the thickness of the PSA sheet, the art disclosed herein can be preferably implemented in such a substrate-free form. Alternatively, the PSA sheet disclosed herein may be in the form of a substrate-supported double-faced PSA sheet having a PSA layer on each side of a non-releasable substrate (support substrate); such a configuration is not specifically shown in the figures.

<PSA Layer>

In the art disclosed herein, the type of the PSA constituting the PSA layer is not particularly limited. For example, the PSA layer can be configured of one or two or more PSAs selected from various known PSAs such as acrylic PSAs, rubber PSAs (natural rubber-based, synthetic rubber-based, mixtures thereof, and the like), silicone PSAs, polyester PSAs, urethane PSAs, polyether PSAs, polyamide PSAs, and fluorine-containing PSAs. Here, the acrylic PSA refers to a PSA in which an acrylic polymer serves as a base polymer (a main component among the polymer components, that is, a component included in more than 50% by weight). The same applies to the meaning of rubber PSAs and other PSAs.

From the standpoints of transparency, weather resistance, and the like, the art disclosed herein can be preferably implemented in the form of a PSA sheet including a PSA layer in which an acrylic PSA is a main component (that is, a component included in more than 50% by weight). The amount of the acrylic PSA in the PSA layer is preferably 70% by weight or more, more preferably 90% by weight or more, or may be more than 98% by weight. The PSA layer may be substantially composed of an acrylic PSA. Hereinafter, a PSA comprising an acrylic polymer as a base polymer and an adhesive sheet having a PSA layer formed from such a PSA will be mainly described, but the PSA sheet disclosed herein is not limited thereto.

(Acrylic Polymer)

The acrylic polymer in the art disclosed herein is preferably a polymerized product of monomeric components including an alkyl (meth)acrylate as a main monomer, also including carboxy group-containing monomer, and further including as necessary a secondary monomer copolymerizable with the main monomer. Here, the main monomer means a main component among the monomeric components constituting the acrylic polymer, that is, a component contained among the monomeric components in an amount of more than 50% by weight.

For example, a compound represented by the following formula (1) can be advantageously used as the alkyl (meth)acrylate.

$$CH_2=C(R^{11})COOR^{12} \quad (1)$$

Here, $R^{11}$ in the formula (1) is a hydrogen atom or a methyl group. $R^{12}$ is an acyclic alkyl group having 1 to 20 carbon atoms (hereinafter such a range of the number of carbon atoms may be expressed as "$C_{1-20}$"). From the standpoint of the storage elastic modulus of the PSA and the like, an alkyl (meth)acrylate in which $R^{12}$ is a $C_{1-14}$ acyclic alkyl group is preferable, and an alkyl (meth)acrylate in which $R^{12}$ is a $C_{1-10}$ acyclic alkyl group is more preferable.

Specific examples of the alkyl (meth)acrylate having a $C_{1-20}$ acyclic alkyl group for $R^{12}$ include, but are not limited to, methyl (meth)acrylate, ethyl (meth)acrylate, propyl (meth)acrylate, isopropyl (meth)acrylate, n-butyl (meth)acrylate, isobutyl (meth)acrylate, s-butyl (meth)acrylate, t-butyl (meth)acrylate, pentyl (meth)acrylate, isopentyl (meth)acrylate, hexyl (meth)acrylate, heptyl (meth)acrylate, 2-ethylhexyl (meth)acrylate, octyl (meth)acrylate, isooctyl (meth)acrylate, nonyl (meth)acrylate, isononyl (meth)acrylate, decyl (meth)acrylate, isodecyl (meth)acrylate, undecyl (meth)acrylate, dodecyl (meth)acrylate, tridecyl (meth)acrylate, tetradecyl (meth)acrylate, pentadecyl (meth)acrylate, hexadecyl (meth)acrylate, heptadecyl (meth)acrylate, octadecyl (meth)acrylate, nonadecyl (meth)acrylate, and eicosyl (meth)acrylate. These alkyl (meth)acrylates can be used singly as one species or in a combination of two or more species. Preferable examples of the alkyl (meth)acrylate include n-butyl acrylate (BA) and 2-ethylhexyl acrylate (2EHA).

Typically, the amount of the alkyl (meth)acrylate among the monomeric components constituting the acrylic polymer is more than 50% by weight, for example 70% by weight or more, may be 85% by weight or more, or may be even 90% by weight or more. The amount of the alkyl (meth)acrylate among the monomeric components is typically less than 100% by weight, a suitable amount is normally 99.5% by weight or less, and this amount may be 98% by weight or less (for example, less than 97% by weight). With the monomeric components having such a composition, it tends to be easy to obtain a PSA sheet having excellent member holding performance.

The art disclosed herein can be preferably implemented in an embodiment in which the monomeric components include 50% by weight or more of a $C_{1-4}$ alkyl (meth)acrylate. With the acrylic polymer having such a monomer composition, a PSA layer is likely to be formed which has a relative dielectric constant higher than that obtained with an acrylic polymer including a (meth)acrylate having an alkyl group having 5 or more carbon atoms at the ester end as a main monomer. A high relative dielectric constant of the PSA layer may be advantageous, for instance, from the standpoint of improving the sensitivity of a pressure-sensitive sensor when the PSA sheet is supposed to be used by attaching to the pressure-sensitive sensor (for example, a pressure-sensitive sensor of an electrostatic capacitive type). Such a PSA sheet is preferably used for fixing a pressure-sensitive sensor, for example, of an electrostatic capacitive type, typically in the form of a double-faced PSA sheet. From the standpoint of further increasing the relative dielectric constant, the amount of the $C_{1-4}$ alkyl (meth)acrylate among the monomeric components may be 70% by weight or more, or may be 85% by weight or more (for example, 90% by weight or more). From the standpoint of obtaining satisfactory member holding performance, a suitable amount of the $C_{1-4}$ alkyl (meth)acrylate among the monomeric components is usually 99.5% by weight or less, and this amount may be 98% by weight or less (for example, 97% by weight or less).

The art disclosed herein can be preferably implemented out in an embodiment in which the monomeric components include 50% by weight or more (for example, 70% by weight or more, or 85% by weight or more, or 90% by weight or more) of a $C_{2-4}$ alkyl acrylate. Specific examples of the $C_{2-4}$ alkyl acrylate include ethyl acrylate, propyl acrylate, isopropyl acrylate, n-butyl acrylate (BA), isobutyl acrylate, s-butyl acrylate, and t-butyl acrylate. The $C_{2-4}$ alkyl acrylates can be used singly as one species or in a combination of two or more species. In such an embodiment, it is easy to realize a PSA sheet which has a PSA layer with a high relative dielectric constant and also has satisfactory adhesion to a member (adherend). In a preferred embodiment, the monomeric components include more than 50% by weight (for example, 70% by weight or more, or 85% by weight or more, or 90% by weight or more) of BA. From the standpoint of obtaining satisfactory member holding performance, a suitable amount of the $C_{1-4}$ alkyl (meth)acrylate among the monomeric components is usually 99.5% by weight or less, and this amount may be 98% by weight or less (for example, less than 97% by weight).

The art disclosed herein may be implemented in an embodiment in which the monomeric components include 50% by weight or more (for example, 70% by weight or more, or 85% by weight or more, or 90% by weight or more) of a $C_{5-20}$ alkyl (meth)acrylate. With the acrylic polymer having such a monomer composition, a PSA layer is likely to be formed which has a relative dielectric constant lower than that obtained with an acrylic polymer having a monomer composition including a $C_{1-4}$ alkyl (meth)acrylate as a main monomer. A low relative dielectric constant of the PSA layer may be advantageous in that, for example, the signal of a pressure-sensitive sensor is less likely to be impaired (for example, a signal intensity is less likely to be reduced) when the PSA sheet is supposed to be used by attaching to the pressure-sensitive sensor (for example, a pressure-sensitive sensor of a resistive type). Such a PSA sheet is preferably used for fixing a pressure-sensitive sensor, for example, of a resistive type (also referred to as a resistive film type), typically in the form of a double-faced PSA sheet. The preferred $C_{5-20}$ alkyl (meth)acrylate is a $C_{6-14}$ alkyl (meth)acrylate. In one embodiment, a $C_{6-10}$ alkyl acrylate (for example, a $C_{8-10}$ alkyl acrylate) can be preferably used.

In the art disclosed herein, the monomeric components constituting the base polymer (for example, the acrylic polymer) include a carboxy group-containing monomer. By including the carboxy group-containing monomer in the monomeric components, it becomes easy to obtain a PSA sheet exhibiting satisfactory shear impact resistance (durability against impacts in the shear direction). In addition, it can be advantageous for improving the adhesion between the PSA layer and the adherend (member to be fixed or the like). Examples of the carboxy group-containing monomer include ethylenically unsaturated monocarboxylic acids such as acrylic acid, methacrylic acid, carboxyethyl (meth) acrylate, carboxypentyl (meth)acrylate, crotonic acid, and isocrotonic acid; and ethylenically unsaturated dicarboxylic acids such as maleic acid, itaconic acid, citraconic acid and anhydrides thereof (maleic anhydride, itaconic anhydride, and the like). These acids and anhydrides can be used singly as one species or in a combination of two species. Among them, acrylic acid (AA) and methacrylic acid (MAA) exemplify the preferred carboxy group-containing monomers. AA is particularly preferred.

The amount of the carboxy group-containing monomer among the monomeric components constituting the base polymer can be, for example, 0.2% by weight or more (typically 0.5% by weight or more) of the monomeric component. Usually, a suitable amount is 1% by weight or more, but may be 2% by weight or more, or 3% by weight or more. When the amount of the carboxy group-containing monomer is more than 3% by weight of the monomeric component, a higher effect (for example, an effect of improving impact adhesive strength) can be exerted and a PSA sheet having better member holding performance can be realized. From such a standpoint, in one embodiment, the amount of the carboxy group-containing monomer may be 3.2% by weight or more, and also may be 3.5% by weight or more, 4% by weight or more, and 4.5% by weight or more of the monomeric components. The upper limit of the amount of the carboxy group-containing monomer is not particularly limited, but from the standpoint of facilitating the reduction of the amount used of the rust inhibitor, the amount of the carboxy group-containing monomer can be, for example, 15% by weight or less, and also may be 12% by weight or less, and 10% by weight or less. The art disclosed herein can be preferably implemented in an embodiment in which the amount of the carboxy group-containing monomer is 7% by weight or less (typically less than 7% by weight, for example, 6.8% by weight or less, or 6.0% by weight or less).

The secondary monomer copolymerizable with the alkyl (meth)acrylate as the main monomer can be useful for introducing a crosslinking point into the acrylic polymer or for increasing the cohesiveness of the acrylic polymer. The secondary monomer can also be useful for adjusting the relative dielectric constant of the PSA layer. For example, the following functional group-containing monomers can be used singly as one species or in a combination of two or more species as the secondary monomer.

Hydroxyl group-containing monomers: for example, hydroxyalkyl (meth)acrylates such as 2-hydroxyethyl (meth)acrylate, 2-hydroxypropyl (meth)acrylate, 3-hydroxypropyl (meth)acrylate, and 4-hydroxybutyl (meth)acrylate; unsaturated alcohols such as vinyl alcohol and allyl alcohol; and polypropylene glycol mono (meth)acrylate.

Amide group-containing monomers: for example, (meth)acrylamide, N,N-dimethyl (meth)acrylamide, N-butyl (meth)acrylamide, N-methylol (meth)acrylamide, N-methylolpropane (meth)acrylamide, N-methoxymethyl (meth)acrylamide, and N-butoxymethyl (meth)acrylamide.

Amino group-containing monomers: for example, aminoethyl (meth)aclylate, N,N-dimethylaminoethyl (meth)acrylate, and t-butylaminoethyl (meth)acrylate.

Monomers having an epoxy group: for example, glycidyl (meth)acrylate, methylglycidyl (meth)acrylate, and allyl glycidyl ether.

Cyano group-containing monomers: for example, acrylonitrile and methacrylonitrile.

Keto group-containing monomers: for example, diacetone (meth)acrylamide, diacetone (meth)acrylate, vinyl methyl ketone, vinyl ethyl ketone, allyl acetoacetate, and vinyl acetoacetate.

Monomers having a nitrogen atom-containing ring: for example, N-vinyl-2-pyrrolidone, N-methylvinylpyrrolidone, N-vinylpyridine, N-vinylpiperidone, N-vinylpyrimidine, N-vinylpiperazine, N-vinylpyrazine, N-vinylpyrrole, N-vinylimidazole, N-vinyloxazole, N-vinylmorpholine, N-vinylcaprolactam, and N-(meth)acryloylmorpholine.

Alkoxysilyl group-containing monomers: for example, 3-(meth)acryloxypropyltrimethoxysilane, 3-(meth)acryloxypropyltriethoxysilane, 3-(meth)acryloxypropylmethyldimethoxysilane, and 3-(meth)acryloxypropylmethyldiethoxysilane.

When the monomeric components constituting the acrylic polymer include a functional group-containing monomer such as described above, the amount of the functional group-containing monomer among the monomeric components is not particularly limited. From the standpoint of suitably exhibiting the effect of using the functional group-containing monomer, the amount of the functional group-containing monomer among the monomeric components can be, for example, 0.1% by weight or more, a suitable amount is usually 0.5% by weight or more, and this amount may be 1% by weight or more. From the standpoint of facilitating the balance of adhesive performance in relation to the main monomer or the carboxy group-containing monomer, a suitable amount of the functional group-containing monomer among the monomeric components is usually 40% by weight or less, and this amount is preferably 20% by weight or less, or may be 10% by weight or less (for example, 5% by weight or less). The art disclosed herein can be preferably implemented in an embodiment in which the monomeric components include substantially no functional group-containing monomer (for example, an embodiment in which the monomeric components include essentially the alkyl (meth) acrylate and the carboxy group-containing monomer). Here, the expression that the monomeric components include substantially no functional group-containing monomer means that a functional group-containing monomer is not used at least intentionally. For example, it may be permitted that about 0.05% by weight or less (typically 0.01% by weight or less) of a functional group-containing monomer is included unintentionally.

The monomeric components constituting the acrylic polymer may include a copolymerizable component other than the aforementioned secondary monomer for the purpose of improving the cohesiveness or the like. Examples of other copolymerizable components include vinyl ester monomers such as vinyl acetate, vinyl propionate, and vinyl laurate; aromatic vinyl compounds such as styrene, substituted styrene (α-methylstyrene and the like), and vinyl toluene; cycloalkyl (meth)acrylates such as cyclohexyl (meth)acrylate, cyclopentyl (meth)acrylate, and isobornyl (meth)acrylate; aromatic ring-containing (meth)acrylates such as aryl (meth)acrylates (for example, phenyl (meth)acrylate), aryloxyalkyl (meth)acrylates (for example, phenoxyethyl (meth)acrylate), and arylalkyl (meth)acrylates (for example, benzyl (meth)acrylate): olefinic monomers such as ethylene, propylene, isoprene, butadiene, and isobutylene; chlorine-containing monomers such as vinyl chloride and vinylidene chloride; isocyanate group-containing monomers such as 2-(meth)acryloyloxyethyl isocyanate; alkoxy group-containing monomers such as methoxyethyl (meth)acrylate and ethoxyethyl (meth)acrylate; vinyl ether monomers such as methyl vinyl ether and ethyl vinyl ether; and polyfunctional monomers having two or more (for example, three or more) polymerizable functional groups (for example, (meth)acryloyl groups) in a molecule, such as 1,6-hexanediol di(meth) acrylate and trimethylolpropane tri(meth)acrylate.

The amount of such other copolymerizable component is not particularly limited and may be suitably selected according to the purpose and application. From the standpoint of suitably exhibiting the effect of the use thereof, a suitable amount is usually 0.05% by weight or more, and this amount may be 0.5% by weight or more. From the standpoint of facilitating the balance of the PSA performance, a suitable amount of the other copolymerizable component among the monomeric components is usually 20% by weight or less, and this amount may be 10% by weight or less (for example, 5% by weight or less). The art disclosed herein also can be preferably implemented in an embodiment in which the monomeric components include substantially no other copolymerizable components. Here, the expression that the monomeric components include substantially no other copolymerizable monomers means that no other copolymerizable monomers is used at least intentionally. For example, it may be permitted that about 0.01% by weight or less of other copolymerizable monomers is included unintentionally.

The copolymer composition of the acrylic polymer can be suitably designed so that the glass transition temperature (Tg) of the polymer is about −15° C. or less (for example, about −70° C. or more and −15° C. or less). Herein, the acrylic polymer's Tg (the Tg of the acrylic polymer) refers to the Tg value determined by the Fox equation based on the composition of the monomers used in the synthesis of the polymer. As shown below, the Fox equation is a relational expression of the Tg of a copolymer and the glass transition temperatures Tgi of the homopolymers obtained by homopolymerization of the monomers constituting the copolymer.

$$1/Tg = \Sigma(Wi/Tgi)$$

In the Fox equation above, Tg represents the glass transition temperature (unit: K) of the copolymer, Wi the weight fraction (copolymerization ratio by weight) of a monomer i in the copolymer, and Tgi the glass transition temperature (unit: K) of the homopolymer of the monomer i.

As for the glass transition temperatures of homopolymers used in determining the Tg, values disclosed in publicly known resources are used. For instance, with respect to the monomers listed below, as the glass transition temperatures of their corresponding homopolymers, the following values are used.

| | |
|---|---|
| 2-ethylhexyl acrylate | −70° C. |
| isononyl acrylate | −60° C. |
| n-butyl acrylate | −55° C. |
| ethyl acrylate | −22° C. |
| methyl acrylate | 8° C. |
| methyl methacrylate | 105° C. |
| 2-hydroxyethyl acrylate | −15° C. |
| 4-hydroxybutyl acrylate | −40° C. |
| vinyl acetate | 32° C. |
| acrylic acid | 106° C. |
| methacrylic acid | 228° C. |

With respect to the Tg values of the homopolymers of other monomers besides those exemplified above, the values given in "Polymer Handbook" (3rd edition, John Wiley & Sons, Inc., Year 1989) are used. When the Polymer Handbook provides two or more values for a certain monomer, the highest value is used. In the case where the values are not described in the Polymer Handbook, those that can be obtained by the measuring method described in Japanese Patent Application Publication No. 2007-51271 is used.

From the standpoint of adhesiveness to an adherend (for example, a member to be fixed), the advantageous Tg of the acrylic polymer is about −25° C. or lower, preferably about −35° C. or lower, and more preferably about −40° C. or lower, but these values are not particularly limiting. In one embodiment, from the standpoint of cohesiveness, the Tg of the acrylic polymer may be, for example, about −65° C. or higher, about −60° C. or higher, or about −55° C. or higher. The art disclosed herein can be preferably implemented in an embodiment in which the Tg of the acrylic polymer is about −65° C. or higher and about −35° C. or lower (for example, about −55° C. or higher and about −40° C. or lower). The Tg of the acrylic polymer can be adjusted by suitably changing the monomer composition (that is, the type of monomers used for synthesizing the polymer and the ratio of the amounts used).

The method for obtaining the acrylic polymer is not particularly limited. Various polymerization methods known as synthetic means for acrylic polymers can be suitably employed, with the methods including a solution polymerization method, emulsion polymerization method, bulk polymerization method, suspension polymerization method, photopolymerization method, etc. For example, a solution polymerization method can be preferably used. The polymerization temperature in the solution polymerization can be suitably selected according to the type of monomer and solvent to be used, the type of polymerization initiator, and the like, and is, for example, about 20° C. to 170° C. (typically, about 40° C. to 140° C.).

In a solution polymerization, the solvent (polymerization solvent) used for polymerization can be suitably selected among heretofore known organic solvents. For instance, one species of solvent or a mixture of two or more species of solvent can be used, selected from aromatic compounds (typically aromatic hydrocarbons) such as toluene; acetic acid esters such as ethyl acetate; aliphatic or alicyclic hydrocarbons such as hexane and cyclohexane; halogenated alkanes such as 1,2-dichloroethane; lower alcohols (e.g. monohydric alcohols with one to four carbon atoms) such as isopropanol; ethers such as tert-butyl methyl ether; and ketones such as methyl ethyl ketone.

The initiator used for polymerization can be suitably selected from conventionally known polymerization initiators according to the type of polymerization method. For example, one or two or more species of azo polymerization initiators such as 2,2'-azobisisobutyronitrile (AIBN) can be preferably used. Other examples of the polymerization initiator include persulfates such as potassium persulfate; peroxide initiators such as benzoyl peroxide and hydrogen peroxide; substituted ethane initiators such as phenyl-substituted ethane; and aromatic carbonyl compounds. Still other examples of the polymerization initiator include redox type initiators based on a combination of a peroxide and a reducing agent. Such polymerization initiators can be used singly as one species or in a combination of two or more species. The amount of the polymerization initiator used may be a usual amount used, for example, about 0.005 to 1 part by weight (typically, about 0.01 to 1 part by weight) with respect to 100 parts by weight of the monomeric components.

The solution polymerization yields a polymerization reaction mixture in a form such that an acrylic polymer is dissolved in an organic solvent. The PSA layer in the art disclosed herein may be formed from a PSA composition comprising the polymerization reaction mixture or an acrylic polymer solution obtained by subjecting the reaction mixture to a suitable work-up. For the acrylic polymer solution, the polymerization reaction mixture can be used after adjusted to suitable viscosity and/or concentration as necessary. Alternatively, an acrylic polymer can be synthesized by a polymerization method other than solution polymerization, such as emulsion polymerization, photopolymerization, bulk polymerization, etc., and an acrylic polymer solution prepared by dissolving the acrylic polymer in an organic solvent can be used as well.

The weight average molecular weight (Mw) of the base polymer (preferably acrylic polymer) in the art disclosed herein is not particularly limited, and may be, for example, in the range of about $10 \times 10^4$ to $500 \times 10^4$. From the standpoint of PSA performance, the Mw of the base polymer is in the range of about $30 \times 10^4$ to $200 \times 10^4$ (more preferably, about $45 \times 10^4$ to $150 \times 10^4$, typically about $65 \times 10^4$ to $130 \times 10^4$). Here, Mw refers to a standard polystyrene equivalent value obtained by gel permeation chromatography (GPC). As the GPC apparatus, for example, model name "HLC-8320 GPC" (column: TSK gel GMH-H (S), available from Tosoh Corporation) can be used.

(Rust Inhibitor)

The PSA layer in the art disclosed herein includes an azole-based rust inhibitor. The azole-based rust inhibitor including an azole compound (a five-membered ring aromatic compound including two or more hetero atoms with at least one of the hetero atoms being a nitrogen atom) as an effective component can be preferably used. Azole compounds which have been conventionally used as rust inhibitors for metals such as copper can be suitably used as the abovementioned azole compound.

Examples of such azole compounds include azoles such as imidazole, pyrazole, oxazole, isoxazole, thiazole, isothiazole, selenazole, 1,2,3-triazole, 1,2,4-triazole, 1,2,5-oxadiazole, 1,3,4-oxadiazole, 1,2,3-thiadiazole, 1,2,4-thiadiazole, 1,3,4-thiadiazole, tetrazole, and 1,2,3,4-thiatriazole; derivatives thereof; amine salts thereof; and metal salts thereof. Examples of derivatives of the azoles include compounds having a structure including a condensed ring of an azole ring and another ring such as a benzene ring. Specific examples thereof include indazole, benzimidazole, benzotriazole (that is, 1,2,3-benzotriazole having a structure in which an azole ring of 1,2,3-triazole is condensed with a benzene ring), and benzothiazole, and derivatives thereof such as alkylbenzotriazoles (for example, 5-methylbenzotriazole, 5-ethylbenzotriazole, 5-n-propylbenzotriazole, 5-isobutylbenzotriazole, and 4-methylbenzotriazole), alkoxybenzotriazoles (for example, 5-methoxybenzotriazole), alkylaminobenzotriazoles, alkylaminosulfonylbenzotriazoles, mercaptobenzotriazole, hydroxybenzotriazole, nitrobenzotriazoles (for example, 4-nitrobenzotriazole), halobenzotriazoles (for example, 5-chlorobenzotriazole), hydroxyalkylbenzotriazoles, hydroxybenzotriazoles, aminobenzotriazoles, (substituted aminomethyl)-tolyltriazoles, carboxybenzotriazole, N-alkylbenzotriazoles, bisbenzotriazoles, naphthotriazoles, mercaptobenzothiazole, and aminobenzothiazole, amine salts thereof, and metal salts thereof. Other examples of derivatives of azoles include azole derivatives having a non-condensed ring structure, for example, compounds with a structure having a substituent on a non-condensed azole ring, for example, 3-amino-1,2,4-triazole and 5-phenyl-1H-tetrazole. The azole compounds can be used singly as one species or in a combination of two or more species.

The preferred examples of compounds that can be used as the azole-based rust inhibitor include benzotriazole-based rust inhibitors including a benzotriazole compound as an effective component. The art disclosed herein can be preferably implemented, for example, in an embodiment in which the base polymer is an acrylic polymer and the rust inhibitor is a benzotriazole-based rust inhibitor. In such an embodiment, a PSA sheet having satisfactory metal corrosion prevention property and excellent member holding performance can be advantageously realized.

The benzotriazole compound is not particularly limited, provided it is a compound having a benzotriazole skeleton. From the standpoint of obtaining a better corrosion preventing effect, a compound having a structure represented by the following formula (2) can be preferably used.

[C1]

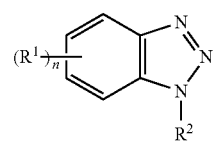

(2)

In the formula (2), $R^1$ is a substituent on the benzene ring, and, for example, can be selected from such substituents as an alkyl group having 1 to 6 carbon atoms, an alkoxy group having 1 to 6 carbon atoms, an aryl group having 6 to 14 carbon atoms, a carboxy group, a carboxyalkyl group having 2 to 6 carbon atoms, an amino group, a mono- or di-$C_{1-10}$ alkylamino group, an amino-$C_{1-6}$ alkyl group, a mono- or di-$C_{1-10}$ alkylamino-$C_{1-6}$ alkyl group, a mercapto group, and an alkoxycarbonyl group having 1 to 6 carbon atoms. In the formula (2), n is an integer of 0 to 4, and when n is 2 or more, the n substituents $R^1$ contained in the formula (2) may be the same or different. $R^2$ in the formula (2) can be selected from such substituents as a hydrogen atom, an alkyl group having 1 to 12 carbon atoms, an alkoxy group having 1 to 12 carbon atoms, an aryl group having 6 to 14 carbon atoms, an amino group, a mono- or di-$C_{1-10}$ alkylamino group, an amino-$C_{1-6}$ alkyl group, a mono- or di-$C_{1-10}$ alkylamino-$C_{1-6}$ alkyl group, a mercapto group, and an alkoxycarbonyl group having 1 to 12 carbon atoms. $R^1$ and $R^2$ may be the same or different. Preferable examples of the benzotriazole compound represented by the formula (2) include 1,2,3-benzotriazole, 5-methylbenzotriazole, 4-methylbenzotriazole, and carboxybenzotriazole.

The amount of the azole-based rust inhibitor (for example, a benzotriazole-based rust inhibitor) is not particularly limited, and can be, for example, 0.01 part by weight or more (typically 0.05 parts by weight or more) with respect to 100 parts by weight of the base polymer. From the standpoint of obtaining a better metal corrosion preventing effect, the amount may be 0.1 part by weight or more, 0.3 part by weight or more, or 0.5 part by weight or more. From the standpoint of increasing the cohesiveness (for example, heat-resistant cohesiveness) of the PSA, a suitable amount of the azole-based rust inhibitor is usually less than 8 parts by weight, and this amount may be 6 parts by weight or less, or 5 parts by weight or less with respect to 100 parts by weight of the base polymer.

In one embodiment, which however is not particularly limiting, the amount of the azole-based rust inhibitor in the PSA layer can be made such as to correspond to 0.2 part by weight or more with respect to 10 parts by weight of the carboxy group-containing monomer contained among the monomeric components constituting the base polymer. The amount of the azole-based rust inhibitor with respect to 10 parts by weight of the carboxy group-containing monomer may be 0.5 part by weight or more, 1 part by weight or more, or 1.5 parts by weight or more. The metal corrosion preventing effect is likely to be improved due to an increase in the amount of the azole-based rust inhibitor with respect to 10 parts by weight of the carboxy group-containing monomer. In some embodiments, the amount of the azole-based rust inhibitor with respect to 10 parts by weight of the carboxy group-containing monomer may be, for example, 4 parts by weight or more, or 6 parts by weight or more. From the standpoint of advantageously achieving both the metal corrosion preventing effect and the member holding performance, the amount of the azole-based rust inhibitor with respect to 10 parts by weight of the carboxy group-containing monomer may be, for example, 30 parts by weight or less, 20 parts by weight or less, 15 parts by weight or less, 10 parts by weight or less, or 5 parts by weight or less (for example, 3 parts by weight or less).

The PSA layer disclosed herein may further include as necessary a rust inhibitor other than the azole-based rust inhibitor, as long as the effect of the present invention is not greatly impaired. Such rust inhibitors can be exemplified by, but are not particularly limited to, amine compounds, nitrites, ammonium benzoate, ammonium phthalate, ammonium stearate, ammonium palmitate, ammonium oleate, ammonium carbonate, salts of dicyclohexylaminebenzoic acid, urea, urotropin, thiourea, phenyl carbamate, and cyclohexylammonium-N-cyclohexyl carbamate (CHC). These rust inhibitors which are not azole compounds (non-azole-based rust inhibitors) can be used singly as one species or in a combination of two or more species. Alternatively, the art disclosed herein can also preferably be implemented in an embodiment substantially without using the non-azole-based rust inhibitor.

Examples of the amine compound include hydroxy group-containing amine compounds such as 2-amino-2-methyl-1-propanol, monoethanolamine, monoisopropanolamine, diethylethanolamine, ammonia, and ammonia water; cyclic amines such as morpholine; cyclic alkyl amine compounds such as cyclohexylamine; and straight-acyclic alkyl amines such as 3-methoxypropyl amine. Examples of the nitrites include dicyclohexylammonium nitrite (DICHAN), diisopropylammonium nitrite (DIPAN), sodium nitrite, potassium nitrite, and calcium nitrite.

(Crosslinking Agent)

As the crosslinking agent in the art disclosed herein, an isocyanate-based crosslinking agent and at least one crosslinking agent having a crosslinkable functional group of a type different from that of isocyanate-based crosslinking agent are used in combination. The inventors of the present invention have found that by using a base polymer (typically an acrylic polymer) copolymerized with a carboxy group-containing monomer in combination with an isocyanate-based crosslinking agent, it is possible to effectively improve the heat-resistant cohesiveness. However, the inventors of the present invention have found that when an azole-based rust inhibitor is included in order to prevent metal corrosion which is a concern due to the use of the carboxy group-containing monomer in the abovementioned configuration, the above-mentioned effect of improving the heat-resistant cohesiveness tends to be impaired. According to the art disclosed herein, a crosslinking agent other than the isocyanate-based crosslinking agent (that is, a crosslinking agent having a crosslinking reactive group different from that of the isocyanate-based crosslinking agent; hereinafter also referred to as "non-isocyanate-based crosslinking agent") is used in combination with the isocyanate crosslinking agent, thereby making it possible to achieve advantageously both high heat-resistant cohesiveness and excellent metal corrosion prevention property in the configuration including the azole-based rust inhibitor. The PSA layer in the art disclosed herein may include the crosslinking agent in a form of, for instance, after crosslinking reaction, before crosslinking reaction, after partial crosslinking, at an intermediate stage, or in combination of these forms. Typically, the crosslinking agent is included in the adhesive layer mostly in a form of after crosslinking reaction.

As the isocyanate-based crosslinking agent, a polyfunctional isocyanate (which refers to a compound having an average of two or more isocyanate groups per molecule, inclusive of compounds having an isocyanurate structure) can be preferably used. For the isocyanate-based crosslinking agent, solely one species or a combination of two or more species can be used.

Examples of the polyfunctional isocyanate include aliphatic polyisocyanates, alicyclic polyisocyanates, and aromatic polyisocyanates.

Examples of an aliphatic polyisocyanate include 1,2-ethylene diisocyanate; tetramethylene diisocyanates such as 1,2-tetramethylene diisocyanate, 1,3-tetramethylene diisocyanate, 1,4-tetramethylene diisocyanate, etc.; hexamethylene diisocyanates such as 1,2-hexamethylene diisocyanate, 1,3-hexamethylene diisocyanate, 1,4-hexamethylene diisocyanate, 1,5-hexamethylene diisocyanate, 1,6-hexamethylene diisocyanate, 2,5-hexamethylene diisocyanate, etc.;

2-methyl-1,5-pentane diisocyanate, 3-methyl-1,5-pentane diisocyanate, and lysine diisocyanate.

Examples of an alicyclic polyisocyanate include isophorone diisocyanate; cyclohexyl diisocyanates such as 1,2-cyclohexyl diisocyanate, 1,3-cyclohexyl diisocyanate, 1,4-cyclohexyl diisocyanate, etc.; cyclopentyl diisocyanates such as 1,2-cyclopentyl diisocyanate, 1,3-cyclopentyl diisocyanate etc.; hydrogenated xylylene diisocyanate, hydrogenated tolylene diisocyanate, hydrogenated diphenylmethane diisocyanate, hydrogenated tetramethylxylene diisocyanate, and 4,4'-dicyclohexylmethane diisocyanate.

Examples of an aromatic polyisocyanate include 2,4-tolylene diisocyanate, 2,6-tolylene diisocyanate, 4,4'-diphenylmethane diisocyanate, 2,4'-diphenylmethane diisocyanate, 2,2'-diphenylmethane diisocyanate, 4,4'-diphenylether diisocyanate, 2-nitrodiphenyl-4,4'-diisocyanate, 2,2'-diphenylpropane-4,4'-diisocyanate, 3,3'-dimethyldiphenylmethane-4,4'-diisocyanate, 4,4'-diphenylpropane diisocyanate, m-phenylene diisocyanate, p-phenylene diisocyanate, naphthylene-1,4-diisocyanate, naphthylene-1,5-diisocyanate, 3,3'-dimethoxydiphenyl-4,4'-diisocyanate, xylylene-1,4-diisocyanate, and xylylene-1,3-diisocyanate.

A preferable example of the polyfunctional isocyanate has an average of three or more isocyanate groups per molecule. Such a tri-functional or higher polyfunctional isocyanate can be a multimer (typically a dimer or a trimer), a derivative (e.g., an adduct of a polyol and two or more polyfunctional isocyanate molecules), a polymer or the like of a di-functional, tri-functional, or higher polyfunctional isocyanate. Examples include polyfunctional isocyanates such as a dimer and a trimer of a diphenylmethane diisocyanate, an isocyanurate (a cyclic trimer) of a hexamethylene diisocyanate, a reaction product of trimethylol propane and a tolylene diisocyanate, a reaction product of trimethylol propane and a hexamethylene diisocyanate, polymethylene polyphenyl isocyanate, polyether polyisocyanate, and polyester polyisocyanate. Commercially available polyfunctional isocyanates include product name DURANATE TPA-100 available from Asahi Kasei Chemicals Corporation and product names CORONATE L, CORONATE HL, CORONATE HK, CORONATE HX, and CORONATE 2096 available from Tosoh Corporation.

The amount of the isocyanate-based crosslinking agent to be used is not particularly limited. For example, it can be set to about 0.5 part by weight or more with respect to 100 parts by weight of the base polymer. From the standpoint of obtaining a higher cohesiveness (particularly heat-resistant cohesiveness), the amount of the isocyanate-based crosslinking agent to be used relative to 100 parts by weight of the base polymer may be, for example, 1.0 part by weight or more, and preferably 1.5 parts by weight or more. From the standpoint of improving the adhesion to the adherend, a suitable amount of the isocyanate-based crosslinking agent to be used is usually 10 parts by weight or less, and this amount may be 8 parts by weight or less, or 5 parts by weight or less (for example, 3 parts by weight or less) with respect to 100) parts by weight of the base polymer. In one embodiment, the amount of the isocyanate-based crosslinking agent to be used relative to 100 parts by weight of the base polymer may be about 1 part by weight or more and about 7 parts by weight or less (for example, about 1.5 parts by weight or more and about 5 parts by weight or less).

The type of the non-isocyanate-based crosslinking agent used in combination with the isocyanate-based crosslinking agent is not particularly limited, and it can be suitably selected for use from conventionally known crosslinking agents. Examples of such a crosslinking agent include epoxy-based crosslinking agents, oxazoline-based crosslinking agents, aziridine-based crosslinking agents, melamine-based crosslinking agents, carbodiimide-based crosslinking agents, hydrazine-based crosslinking agents, amine-based crosslinking agents, peroxide-based crosslinking agents, metal chelate-based crosslinking agents, metal alkoxide-based crosslinking agents, metal salt-based crosslinking agents, and silane coupling agents. The non-isocyanate-based crosslinking agents can be used singly as one species or in a combination of two or more species.

The amount of non-isocyanate-based crosslinking agent used is not particularly limited as long as it is more than 0 part by weight relative to 100 parts by weight of the base polymer. The amount of non-isocyanate-based crosslinking agent used can be set so as to obtain the desired effect. In some embodiments, the amount of non-isocyanate-based crosslinking agent used can be, for example, 0.001 part by weight or more, 0.002 part by weight or more, 0.005 part by weight or more, or 0.008 part by weight or more, relative to 100 parts by weight of the base polymer. As the amount of non-isocyanate-based crosslinking agent used increases, higher cohesiveness tends to be obtained. In some other embodiments, the amount of the non-isocyanate-based crosslinking agent used can be, for example, 10 parts by weight or less, 8 parts by weight or less, 5 parts by weight or less, or 3 parts by weight or less, relative to 100 parts by weight of the base polymer. As the amount of non-isocyanate-based crosslinking agent used decreases, the adhesiveness to the adherend tends to be improved.

In one preferred embodiment, an epoxy-based crosslinking agent can be used as the non-isocyanate-based crosslinking agent. As the epoxy-based crosslinking agent, a compound having two or more epoxy groups in a molecule can be used without particular limitation. An epoxy-based crosslinking agent having 3 to 5 epoxy groups in a molecule is preferable. Epoxy-based crosslinking agents can be used singly as one species or in a combination of two or more species.

Specific examples of the epoxy-based crosslinking agent include, but are not limited to, N,N,N',N'-tetraglycidyl-m-xylenediamine, 1,3-bis(N,N-diglycidylaminomethyl)cyclohexane, 1,6-hexanediol diglycidyl ether, polyethylene glycol diglycidyl ether, and polyglycerol polyglycidyl ether. Examples of commercially available epoxy-based crosslinking agents include product names TETRAD-C and TETRAD-X both available from Mitsubishi Gas Chemical Co., Inc., product name EPICLON CR-5L available from DIC Corp., product name DENACOL EX-512 available from Nagase ChemteX Corporation, product name TEPIC-G available from Nissan Chemical Industries, Ltd., and the like.

The amount of the epoxy-based crosslinking agent to be used is not particularly limited. The amount of the epoxy-based crosslinking agent to be used can be, for example, more than 0 part by weight and about 1 part by weight or less (typically about 0.001 to 0.5 part by weight) with respect to 100 parts by weight of the base polymer. From the standpoint of advantageously exhibiting the effect of improving the cohesiveness, a suitable amount of the epoxy-based crosslinking agent to be used is usually about 0.002 part by weight or more, and this amount is preferably about 0.005 part by weight or more, and more preferably about 0.008 part by weight or more with respect to 100 parts by weight of the base polymer. From the standpoint of improving the adhesion to an adherend, a suitable amount of the epoxy-based crosslinking agent to be used is usually about 0.2 part by weight or less, and this amount is preferably about 0.1 part by weight or less, more preferably less than about 0.05 part by weight, and even more preferably less than about 0.03 part by weight (for example, about 0.025 part by weight or less) with respect to 100 parts by weight of the base polymer.

In some other preferred embodiments, a non-isocyanate-based crosslinking agent other than the epoxy-based crosslinking agent may be used as the non-isocyanate-based crosslinking agent. Examples of the non-isocyanate-based crosslinking agent other than the epoxy-based crosslinking agent include oxazoline-based crosslinking agents, aziridine-based crosslinking agents, melamine-based crosslinking agents, carbodiimide-based crosslinking agents, hydrazine-based crosslinking agents, metal chelate-based crosslinking agents, and silane coupling agents.

As the oxazoline-based crosslinking agent, a species having one or more oxazoline groups per molecule can be used without particular limitations. For the oxazoline-based crosslinking agent, solely one species or a combination of two or more species can be used. The oxazoline group can be either 2-oxazoline group, 3-oxazoline group or 4-oxazoline group. Normally, a 2-oxazoline group-containing oxazoline-based crosslinking agent can be preferably used. For instance, a copolymer of an addition-polymerizable oxazoline and other monomer(s) can be used as the oxazoline-based crosslinking agent. Non-limiting examples of such addition-polymerizable oxazoline include 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline and 2-isopropenyl-5-ethyl-2-oxazoline.

Examples of oxazoline-based crosslinking agents include those listed as examples in Japanese Patent Application Publication No. 2009-001673. In particular, it can be a compound having a main chain of an acryl structure or a styrene structure as well as an oxazoline group as a side chain of the main chain. Preferably, it can be an oxazoline-group-containing acrylic polymer having a main chain of an acryl structure and an oxazoline group as a side chain of the main chain.

Examples of commercially available oxazoline-based crosslinking agents include products of Nippon Shokubai Co., Ltd., under trade names EPOCROS WS-500, EPOCROS WS-700, EPOCROS K-2010E, EPOCROS K-2020E and EPOCROS K-2030E.

The amount of the oxazoline-based crosslinking agent used can be, for example, 0.05 part by weight or more, 0.1 part by weight or more, or 0.5 part by weight or more, relative to 100 pats by weight of the base polymer. In some embodiments, the amount of the oxazoline-based crosslinking agent used relative to 100 parts by weight of the base polymer may be 1 part by weight or more, or 1.5 parts by weight or more. As the amount of oxazoline-based crosslinking agent used increases, higher cohesiveness tends to be obtained. From the standpoint of improving the adhesion to an adherend, the amount of the oxazoline-based crosslinking agent to be used can be, for example, 10 parts by weight or less, 8 parts by weight or less, 5 parts by weight or less, or 3 parts by weight or less, relative to 100 pats by weight of the base polymer.

Examples of aziridine-based crosslinking agents include trimethylolpropane tris[3-(l-azyridinyl)propionate] and trimethylolpropane tris[3-(1-(2-methyl)azyridinyl propionate)]. A commercially available product can be used as the aziridine-based cross-linking agent. Examples thereof include CHEMITITE series (available from NIPPON SHOKUBAI CO., Ltd.) such as CHEMITITE PZ-33 and CHEMITITE DZ-22E. In some embodiments, the amount of the aziridine-based crosslinking agent used can be selected, for example, among the above-described amounts concerning the use of the epoxy-based crosslinking agent or the oxazoline-based crosslinking agent. The same can be applied to the amount of other non-isocyanate-based crosslinking agents such as melamine-based crosslinking agents, carbodiimide-based crosslinking agents, hydrazine-based crosslinking agents, metal chelate-based crosslinking agents, and silane coupling agents used.

Examples of melamine-based crosslinking agents include hexamethylolmelamine and butylated melamine resin (e.g., product name SUPER BECKAMINE J-820-60N, available from DIC Corporation).

The carbodiimide-based cross-linking agent is a compound having at least one, typically two or more carbodiimide group(s) as crosslinkable functional group(s). The carbodiimide group is a functional group (—N=C=NH) in which one hydrogen atom is abstracted from carbodiimide (HN=C=NH) or a functional group (—N=C=N—) in which two hydrogen atoms are abstracted therefrom. The carbodiimide group is capable of reacting with a carboxyl group.

A commercially available product can be used as the carbodiimide-based cross-linking agent. Examples thereof include CARBODILITE series (available from NIS-SHINBO INDUSTRIES, INC.) such as: the CARBODILITE V series including CARBODILITE V-02, CARBODILITE V-02-L2 and CARBODILITE V-04; and the CARBODILITE E series including CARBODILITE E-01, CARBODILITE E-02, and CARBODILITE E-04.

The hydrazine-based cross-linking agent is a hydrazino group-containing compound having a hydrazino group ($H_2N$—NH—) as a crosslinkable functional group. Examples thereof include polyhydrazide polycarboxylic acid such as dihydrazide oxalic acid, dihydrazide malonic acid, dihydrazide glutaric acid, dihydrazide succinic acid, dihydrazide adipic acid, dihydrazide azelaic acid, dihydrazide sebacic acid, dihydrazide dodecanedioic acid, dihydrazide maleic acid, dihydrazide fumaric acid, dihydrazide diglycolic acid, dihydrazide tartaric acid, dihydrazide malic acid, dihydrazide isophthalic acid, dihydrazide terephthalic acid; trihydrazide citric acid, and 7,11-ocatadecadiene-1,18-dicarbohydrazide; and hydantoins such as 1,3-bis(hydrazinocarbonoethyl)-5-isopropylhydantoin.

As the hydrazine-based cross-linking agent, a commercially available product can be used. Examples thereof include AJICURE series (available from Ajinomoto Fine-Techno Co., Inc.) such as AJICURE VDH (7,11-octadecadiene-1,18-dicarbohydrazide), AJICURE UDH (1,3-bis(hydrazinocarbonoethyl)-5-isopropylhydantoin).

Examples of metal chelate-based crosslinking agents include those listed in Japanese Patent Application Publication No. 2007-063536. In particular, examples include aluminum chelate-based compounds, titanium chelate-based compounds, zinc chelate-based compounds, zirconium chelate-based compounds, iron chelate-based compounds, cobalt chelate-based compounds, nickel chelate-based compounds, tin chelate-based compounds, manganese chelate-based compounds, and chromium chelate-based compounds.

As the silane coupling agent, heretofore known silane coupling agents in which the crosslinkable functional group is a silicon (Si)-containing group (for instance, an alkoxysilyl group) can be used. Non-limiting examples of silane coupling agents include 3-glycidoxypropyltrimethoxysilane, 3-glycidoxypropyltriethoxysilane, 3-glycidoxypropylmethyldiethoxysilane, 2-(3,4 epoxycyclohexyl)ethyltrimethoxy silane, 3-aminopropyltrimethoxysilane, N-2-

(aminoethyl)-3-aminopropylmethyldimethoxysilane, 3-triethoxysilyl-N-(1,3-dimethylbutylidene)propylamine. N-phenyl-γ-aminopropyltrimethoxysilane, 3-acryloxypropyltrimethoxysilane, and 3-methacryloxypropyltriethoxysilane.

In the art disclosed herein, the relationship between the amount of the isocyanate-based crosslinking agent and the amount of the non-isocyanate-based crosslinking agent (for example, epoxy-based crosslinking agent) is not particularly limited. The amount of the non-isocyanate-based crosslinking agent can be, for example, about 0.001 time or more and about 5 times or less of the amount of the isocyanate-based crosslinking agent. It can be about 0.002 time or more and about 3 times or less.

In some embodiments, the amount of the non-isocyanate-based crosslinking agent can be, for example, about 1/50 or less of the amount of the isocyanate-based crosslinking agent. From the standpoint of more advantageously achieving both adhesion to the adherend and cohesiveness, a suitable amount of the non-isocyanate-based crosslinking agent is about 1/75 or less, and preferably about 1/100 or less (for example, 1/150 or less) of the isocyanate-based crosslinking agent amount, on a weight basis. From the standpoint of advantageously exerting the effect of using the isocyanate-based crosslinking agent in combination with the non-isocyanate-based crosslinking agent (for example, epoxy-based crosslinking agent), a suitable amount of the non-isocyanate-based crosslinking agent is usually about 1/1000 or more, for example, about 1/500 or more of the amount of the isocyanate-based crosslinking agent. Although not particularly limited, for example, when an epoxy-based crosslinking agent is used as the non-isocyanate-based crosslinking agent, the above-described relationship between the amounts of the isocyanate-based crosslinking agent and the non-isocyanate-based crosslinking agent used can be preferably applied.

In some other embodiments, the amount of non-isocyanate-based crosslinking agent can be, for example, about 0.1 time or more and about 5 times or less, about 0.3 time or more and about 3 times or less, or about 0.5 time or more and about 2 times or less, or about 0.7 time or more and about 1.5 times or less of the amount of the isocyanate-based crosslinking agent. Although not particularly limited, for example, when an oxazoline-based crosslinking agent is used as the non-isocyanate-based crosslinking agent, the above-described relationship between the amounts of the isocyanate-based crosslinking agent and the non-isocyanate-based crosslinking agent used can be preferably applied.

(Tackifier Resin)

The PSA layer in the art disclosed herein may include a tackifier resin. As a result, the peel strength of the PSA sheet can be increased and the member holding performance can be improved. One or two or more selected from a variety of known tackifier resins such as a phenolic tackifier resin, a terpene tackifier resin, a modified terpene tackifier resin, a rosin tackifier resin, a hydrocarbon tackifier resin, an epoxy tackifier resin, a polyamide tackifier resin, an elastomer tackifier resin, and a ketone tackifier resin can be used as the tackifier resin.

Examples of the phenolic tackifier resins include terpene phenolic resins, hydrogenated terpene phenolic resins, alkylphenolic resins, and rosin phenolic resins.

The term "terpene phenolic resin" refers to a resin including a terpene residue and a phenol residue, and is inclusive of both a copolymer of a terpene and a phenol compound (terpene-phenol copolymer resin) and a phenol-modified homopolymer or copolymer of a terpene (phenol-modified terpene resin). Preferred examples of terpenes constituting such terpene phenolic resins include monoterpenes such as α-pinene, β-pinene, and limonene (including d-form, l-form and d/l form (dipentene)). The hydrogenated terpene phenolic resin has a structure obtained by hydrogenating such a terpene phenolic resin. Such a resin is sometimes referred to as a hydrogen-added terpene phenolic resin.

The alkylphenolic resin is a resin (oily phenolic resin) obtainable from an alkylphenol and formaldehyde. Examples of alkylphenol resins include novolac type and resole type resins.

A rosin phenolic resin is typically a phenol-modified product of rosins or various rosin derivatives (including rosin esters, unsaturated fatty acid-modified rosins, and unsaturated fatty acid-modified rosin esters) described later. Examples of the rosin phenolic resin include rosin phenolic resins obtained, for example, by a method of adding a phenol to a rosin or the rosin derivative with an acid catalyst and thermally polymerizing.

Examples of terpene-based tackifier resins include polymers of terpenes (typically monoterpenes) such as α-pinene, β-pinene, d-limonene, l-limonene, and dipentene. The polymer may be a homopolymer of one type of terpene or a copolymer of two or more types of terpenes. The homopolymers of one type of terpene can be exemplified by an α-pinene polymer, β-pinene polymer, and a dipentene polymer. The modified terpene resin is exemplified by modifications of the terpene resin. Specific examples include styrene-modified terpene resins and hydrogenated terpene resins.

The term "rosin-based tackifier resin" as used herein is inclusive of both rosins and rosin derivative resins. Examples of rosins include unmodified rosins (raw rosins) such as gum rosin, wood rosin, and tall oil rosin, and modified rosins obtained by modification of the unmodified rosins by hydrogenation, disproportionation, polymerization, and the like (hydrogenated rosins, disproportionated rosins, polymerized rosins, and other chemically modified rosins, and the like).

The rosin derivative resin is typically a derivative of the rosin such as described above. The term "rosin derivative resin" as used herein is inclusive of derivatives of unmodified rosins and derivatives of modified rosins (including hydrogenated rosins, disproportionated rosins and polymerized rosins). Examples thereof include rosin esters such as unmodified rosin esters which are esters of unmodified rosins and alcohols, and modified rosin esters which are esters of modified rosins and alcohols; unsaturated fatty acid-modified rosins obtained by modification of rosins with unsaturated fatty acids; unsaturated fatty acid-modified rosin esters obtained by modification of rosin esters with unsaturated fatty acids; rosin alcohols obtained by reduction treatment of carboxy groups of rosins or various abovementioned rosin derivatives (including rosin esters, unsaturated fatty acid-modified rosins and unsaturated fatty acid-modified rosin esters); and metal salts of rosins or various abovementioned rosin derivatives. Specific examples of rosin esters include methyl esters, triethylene glycol esters, glycerin esters, and pentaerythritol esters of unmodified rosins or modified rosins (hydrogenated rosins, disproportionated rosins, polymerized rosins, and the like).

Examples of the hydrocarbon-based tackifier resin include various hydrocarbon resins such as aliphatic hydrocarbon resins, aromatic hydrocarbon resins, aliphatic cyclic hydrocarbon resins, aliphatic/aromatic petroleum resins (styrene-olefin copolymers and the like), aliphatic/alicyclic petroleum resins, hydrogenated hydrocarbon resin, coumarone resins, and coumarone indene resins.

The softening point of the tackifier resin is not particularly limited. From the standpoint of improving the cohesiveness, in one embodiment, a tackifier resin having a softening point (softening temperature) of about 80° C. or higher (preferably, about 100° C. or higher) can be preferably used. The art disclosed herein can be preferably implemented in an embodiment in which more than 50% by weight (more preferably, more than 70% by weight, for example, more than 90% by weight) of the total amount of the tackifier resin (taken as 100% by weight) contained in the PSA layer is taken by a tackifier resin having the abovementioned softening point. For example, a phenolic tackifier resin (terpene phenolic resin or the like) having such a softening point can be advantageously used. The tackifier resin may include, for example, a terpene phenolic resin having a softening point of about 135° C. or higher (furthermore, about 140° C. or higher). The upper limit of the softening point of the tackifier resin is not particularly limited. From the standpoint of improving the adhesion to an adherend, in one embodiment, a tackifier resin having a softening point of about 200° C. or lower (more preferably about 180° C. or lower) can be preferably used. The softening point of the tackifier resin can be measured based on a softening point test method (ring and ball method) prescribed in JIS K 2207.

In the case where the PSA layer includes a tackifier resin, the amount of the tackifier resin used is not particularly limited, and may be suitably set, for example, within a range of about 1 to 100 parts by weight with respect to 100 parts by weight of the base polymer. From the standpoint of advantageously exerting the effect of improving the peel strength, a suitable amount of the tackifier resin used per 100 parts by weight of the base polymer (for example, acrylic polymer) is usually 5 parts by weight or more, and this amount is preferably 10 parts by weight or more, or may be 15 parts by weight or more. From the standpoint of heat-resistant cohesiveness, a suitable amount of the tackifier resin used per 100 parts by weight of the base polymer (for example, acrylic polymer) is usually 50 parts by weight or less, and this amount may be 40 parts by weight or less, or 30 parts by weight or less.

In a preferred embodiment, the tackifier resin includes one or two or more phenolic tackifier resins (typically, a terpene phenolic resin). The art disclosed herein can be preferably implemented in an embodiment, for example, in which about 25% by weight or more (more preferably, about 30% by weight or more) of the total amount of the tackifier resin (taken as 100% by weight) is a terpene phenolic resin. About 50% by weight or more of the total amount of the tackifier resin may be a terpene phenolic resin, and about 80% by weight or more (for example, about 90% by weight or more) may be a terpene phenolic resin. Substantially all of the tackifier resin (for example, about 95% by weight to 100% by weight, even about 99% by weight to 100% by weight) may be a terpene phenolic resin.

In one embodiment of the art disclosed herein, which however is not particularly limiting, the tackifier resin may include a tackifier resin having a hydroxyl value higher than 20 mg KOH/g. Among such tackifier resins, a tackifier resin having a hydroxyl value of 30 mg KOH/g or more is preferable. Hereinafter, a tackifier resin having a hydroxyl value of 30 mg KOH/g or more may be referred to as a "high-hydroxyl-value resin". With the tackifier resin including such a high-hydroxyl-value resin, a PSA layer having excellent adhesion to the adherend and high cohesiveness can be realized. In one embodiment, the tackifier resin may include a high-hydroxyl-value resin having a hydroxyl value of 50 mg KOH/g or more (more preferably, 70 mg KOH/g or more).

A value measured by the potentiometric titration method prescribed in JIS K 0070:1992 can be used as the hydroxyl value. A specific measurement method is described hereinbelow.

[Method for Measuring Hydroxyl Value]
1. Reagents
   (1) A reagent prepared by taking about 12.5 g (about 11.8 mL) of acetic anhydride, adding pyridine to make the total amount 50 mL, and thoroughly stirring is used as an acetylation reagent. Alternately, a reagent prepared by taking about 25 g (about 23.5 mL) of acetic anhydride, adding pyridine to make the total amount 100 mL, and thoroughly stirring is used.
   (2) A 0.5 mol/L ethanol solution of potassium hydroxide is used as a measuring reagent.
   (3) In addition, toluene, pyridine, ethanol and distilled water are prepared.
2. Operation
   (1) About 2 g of a sample is accurately weighed in a flat-bottomed flask, 5 mL of the acetylation reagent and 10 mL of pyridine are added, and an air cooling tube is attached.
   (2) The flask is heated in a bath at 100° C. for 70 min and allowed to cool. Then, 35 mL of toluene is added as a solvent from the top of the cooling tube, followed by stirring. A total of 1 mL of distilled water is thereafter added, and stirring is implemented to decompose the acetic anhydride. Heating is then performed again in the bath for 10 min in order to complete the decomposition, and the system is allowed to cool.
   (3) The cooling tube is washed with 5 mL of ethanol and removed. Next, 50 mL of pyridine is added as a solvent, followed by stirring.
   (4) A total of 25 mL of a 0.5 mol/L ethanol solution of potassium hydroxide is added using a hole pipette.
   (5) Potentiometric titration is performed with a 0.5 mol/L ethanol solution of potassium hydroxide. The inflection point of the obtained titration curve is taken as the end point.
   (6) In a blank test, the operations (1) to (5) are performed without introducing the sample.
3. Calculation
The hydroxyl value is calculated by the following formula.

$$\text{Hydroxyl value (mg KOH/g)} = [(B-C) \times f \times 28.05]/S + D.$$

Here,
B: amount (mL) of the 0.5 mol/L ethanol solution of potassium hydroxide used for the blank test,
C: amount (mL) of the 0.5 mol/L ethanol solution of potassium hydroxide used for the sample,
f: factor of the 0.5 mol/L ethanol solution of potassium hydroxide,
S: weight (g) of the sample,
D: acid value, and
28.05: ½ of the molecular weight (56.11) of potassium hydroxide.

A resin having a hydroxyl value equal to or higher than a predetermined value, among the various tackifier resins described above, can be used as the high-hydroxyl-value resin. The high-hydroxyl-value resins can be used singly as one species or in a combination of two or more species. For example, a phenolic tackifier resin having a hydroxyl value of 30 mg KOH/g or more can be preferably used as the high-hydroxyl-value resin. In one preferred embodiment, a terpene phenolic resin having a hydroxyl value of 30 mg KOH/g or more is used as the tackifier resin. The terpene phenolic resin is advantageous because the hydroxyl value can be arbitrarily controlled by the copolymerization ratio of phenol.

The upper limit of the hydroxyl value of the high-hydroxyl-value resin is not particularly limited. From the standpoint of compatibility with the base polymer and the like, a suitable hydroxyl value of the high-hydroxyl-value resin is usually about 200 mg KOH/g or less, preferably about 180 mg KOH/g or less, more preferably about 160 mg KOH/g or less, and even more preferably about 140 mg KOH/g or less. The art disclosed herein can be preferably implemented in an embodiment in which the tackifier resin includes a high-hydroxyl-value resin (for example, a phenol-based tackifier resin, preferably a terpene phenolic resin) having a hydroxyl value of 30 mg KOH/g to 160 mg KOH/g. In one embodiment, a high-hydroxyl-value resin having a hydroxyl value of 30 mg KOH/g to 80 mg KOH/g (for example, 30 mg KOH/g to 65 mg KOH/g) can be preferably used. In another embodiment, a high-hydroxyl-value resin having a hydroxyl value of 70 mg KOH/g to 140 mg KOH/g can be preferably used.

When a high-hydroxyl-value resin is used, the amount of the high-hydroxyl-value resin (for example, a terpene phenolic resin) in the entire tackifier resin included in the PSA layer can be, for example, about 25% by weight or more, preferably about 30% by weight or more, and more preferably about 50% by weight or more (for example, about 80% by weight or more, typically about 90% by weight or more), but these values are not particularly limiting. Substantially all of the tackifier resin (for example, about 95% by weight to 100% by weight, more preferably about 99% by weight to 100% by weight) may be a high-hydroxyl-value resin.

(Colorant)

A colorant can be contained in the PSA layer. This makes it possible to adjust the light transmission property (light shielding property) of the PSA layer. For example, the light transmittance of the PSA layer can be adjusted. Adjusting the light transmission property of the PSA layer can also be useful for adjusting the light transmission property of the PSA sheet including the PSA layer. Further, the colorant can be used for adjusting the relative dielectric constant.

Conventionally known pigments and dyes can be used as the colorant. The pigments can be exemplified by inorganic pigments such as zinc carbonate, zinc oxide, zinc sulfide, talc, kaolin, calcium carbonate, titanium oxide, silica, lithium fluoride, calcium fluoride, barium sulfate, alumina, zirconia, iron oxide-based, ion hydroxide-based, chromium oxide-based, spinel-based, chromic acid-based, chromium vermilion-based, iron blue-based, aluminum powder-based, bronze powder-based, and silver powder-based pigments, and calcium phosphate, and organic pigments such as phthalocyanine-based, azo-based, condensed azo-based, azo lake-based, anthraquinone-based, perylene-perinone-based, indigo-based, thioindigo-based, isoindolinone-based, azomethine-based, dioxazine-based, quinacridone-based, aniline black-based, triphenylmethane-based, and carbon black-based pigments. Examples of the dyes include azo-based dyes, anthraquinone, quinophthalone, styryl, diphenylmethane, triphenylmethane, oxazine, triazine, xanthan, methane, azomethine, acridine, and diazine. The colorants can be used singly as one species or in a combination of two or more species suitably.

A black colorant can be preferably used since light shielding property can be efficiently adjusted with a small amount of the colorant. Specific examples of the black colorants include carbon black (furnace black, channel black, acetylene black, thermal black, lamp black, pine smoke, and the like), graphite, copper oxide, manganese dioxide, aniline black, perylene black, titanium black, cyanine black, activated carbon, ferrites (nonmagnetic ferrites, magnetic ferrites, and the like), magnetite, chromium oxide, iron oxide, molybdenum disulfide, chromium complexes, anthraquinone-based colorant, and the like. Of these, carbon black is preferable.

The compounded amount of the colorant is not particularly limited and can be set so as to form a PSA layer having a desired light transmittance. A suitable compounded amount of the colorant is usually 0.5 part by weight or more, and this amount is preferably 1.0 part by weight or more, and more preferably 1.5 parts by weight or more with respect to 100 parts by weight of the base polymer. The compounded amount of the colorant can be, for example, 15 parts by weight or less with respect to 100 parts by weight of the base polymer. From the standpoint of suppressing the deterioration of PSA properties which may be caused by the compounded colorant, a suitable amount of the colorant is usually 12 parts by weight or less, preferably 10 parts by weight or less, and more preferably 8 parts by weight or less with respect to 100 parts by weight of the base polymer. In one preferred embodiment, the compounded amount of the colorant can be 7 parts by weight or less with respect to 100 parts by weight of the base polymer.

A suitable amount of the colorant in the PSA layer is usually 0.3% by weight or more, preferably 0.5% by weight or more, and more preferably 1.0% by weight or more on the basis of the PSA layer. The amount of the colorant can be, for example, less than 13% by weight, preferably less than 10% by weight, more preferably less than 9% by weight, and even more preferably less than 7% by weight. In a preferred embodiment, the amount of the colorant is the PSA layer can be less than 6% by weight.

(Other Additives)

In addition to the above-described components, the PSA composition may contain, as necessary, various additives which are common in the field of PSAs, such as a leveling agent, a crosslinking aid, a plasticizer, a softener, an antistatic agent, an aging-preventing agent, an ultraviolet absorber, an antioxidant, and a light stabilizer. Conventionally known additives of these types can be used by conventional methods, and the present invention is not particularly characterized thereby. Therefore, detailed description thereof will be omitted.

The PSA layer disclosed herein is a layer made of a PSA and can be formed from a water-based PSA composition, a solvent-type PSA composition, a hot-melt PSA composition, and an active energy ray-curable PSA composition which is sensitive to irradiation with active energy rays such as UV rays and electron rays. The water-based PSA composition, as referred to herein, is a PSA composition in the form including a PSA (PSA layer-forming component) in a solvent including water as a main component (water-based solvent), and such composition is typically inclusive of water dispersion-type PSA compositions (compositions in which at least a part of the PSA is dispersed in water), and the like. Further, the solvent-type PSA composition means a PSA composition in the form including a PSA in an organic solvent. From the standpoint of adhesive properties and the like, the art disclosed herein can be preferably implemented in an embodiment in which the PSA layer is formed from a solvent-based PSA composition.

(Formation of PSA Layer)

The PSA layer disclosed herein can be formed by a conventionally known method. For example, a method for forming a PSA layer by applying a PSA composition to a releasable surface (release surface) and drying can be used. With a PSA sheet configured to have a support substrate, for example, a direct method for forming a PSA layer by directly applying (typically, coating) a PSA composition to the support substrate followed by drying can be used. A transfer method may also be used in which a PSA composition is applied to a releasable surface (release surface) and dried to form a PSA layer, and the PSA layer is then transferred to a support substrate. For example, the surface of a release liner described hereinbelow can be preferably used as the release surface. The PSA layer disclosed herein is typically formed in a continuous form, but not limited to such form. For instance, the PSA layer may be formed in a random or regular pattern of dots, stripes, etc.

The PSA composition can be applied with a heretofore known coater, for instance, a gravure roll coater, die coater, and bar coater. Alternatively, the PSA composition can be applied by immersion, curtain coating, etc.

From the standpoints of accelerating the crosslinking reaction, improving production efficiency, and the like, it is preferable to dry the PSA composition under heating. The drying temperature can be, for example, about 40° C. to 150° C., and usually temperature of about 60° C. to 130° C. is preferable. After drying the PSA composition, aging may be implemented for the purpose of adjusting the distribution or migration of components within the PSA layer, advancing the crosslinking reaction, relaxing strain that may be present in the PSA layer, and the like.

The thickness of the PSA layer is not particularly limited. From the standpoint of preventing the PSA sheet from becoming excessively thick, a suitable thickness of the PSA layer is usually about 100 μm or less, and this thickness is preferably about 70 μm or less, and more preferably about 50 μm or less (for example, about 30 μm or less). The lower limit of the thickness of the PSA layer is not particularly limited, but from the standpoint of adhesion to an adherend, it is advantageous to make it about 4 μm or more, preferably about 6 μm or more, and more preferably about 10 μm or more (for example, about 15 μm or more).

(Relative Dielectric Constant of PSA Layer)

The PSA sheet disclosed herein can include a PSA layer having a relative dielectric constant of 3 or more (for example, 3.1 or more) at 300 kHz. Here, the relative dielectric constant is the dielectric constant defined in JIS K 6911. The relative dielectric constant of the PSA layer at 300 kHz can be measured according to JIS K 6911. This also applies to the examples described hereinbelow. The relative dielectric constant hereinbelow in this description refers to the relative dielectric constant at 300 kHz, unless specifically stated otherwise.

A high relative dielectric constant of the PSA layer can be advantageous from the standpoint of improving the sensitivity of a pressure-sensitive sensor and the like when the PSA sheet is supposed to be used by attaching to the pressure-sensitive sensor (for example, a pressure-sensitive sensor of an electrostatic capacitive type). A PSA sheet including a PSA layer having a high dielectric constant is preferably used for fixing a pressure-sensitive sensor, for example, of an electrostatic capacitive type, typically in the form of a double-faced PSA sheet. The upper limit of the relative dielectric constant of the PSA layer is not particularly limited. A suitable relative dielectric constant is usually 6 or less or may be, for example, 5 or less because such a value makes it possible to obtain easily a PSA sheet in which both metal corrosion prevention property and member holding performance are achieved at a high level.

The relative dielectric constant of the PSA layer can be adjusted, for example, by the composition of the monomeric components constituting the base polymer (for example, the type of the main monomer, the amount of the carboxy group-containing monomer used, and the presence or absence and the amount used of the functional group-containing monomer), and the amount of the crosslinking agent used.

<Support Substrate>

In the embodiment in which the PSA sheet disclosed herein is a substrate-supported PSA sheet of a single-faced PSA or a double-faced PSA type, examples of the substrate (backing) that supports the PSA layer include a resin film, paper, cloth, a rubber sheet, a foam sheet, a metal foil, and composites thereof. Examples of the resin film include a polyolefin film such as polyethylene (PE) film, polypropylene (PP) film, and ethylene-propylene copolymer film; a polyester film such as polyethylene terephthalate (PET) film; a vinyl chloride resin film; a vinyl acetate resin film; a polyimide resin film a polyamide resin film; a fluororesin film; and cellophane. Examples of paper include Japanese paper, craft paper, glassine paper, high-quality paper, synthetic paper, and top coat paper. Examples of the cloth include a woven fabric and a nonwoven fabric made of various fibrous substances which are used singly or mixed with each other. Examples of the fibrous substance include cotton, staple fiber, manila hemp, pulp, rayon, acetate fiber, polyester fiber, polyvinyl alcohol fiber, polyamide fiber, and polyolefin fiber. Examples of the rubber sheet include a natural rubber sheet and a butyl rubber sheet. Examples of the foam sheet include a foamed polyurethane sheet and a foamed polychloroprene rubber sheet. Examples of the metal foil include an aluminum foil and a copper foil.

The term "nonwoven fabric" as used herein refers to a nonwoven fabric for PSA sheets, which is mainly used in the field of PSA tapes and other PSA sheets, and is typically a nonwoven fabric such as prepared using a general paper machine (sometimes referred to as so-called "paper"). The resin film referred to herein is typically a nonporous resin sheet which is distinguished from, for example, a nonwoven fabric (that is, not inclusive of a nonwoven fabric). The resin film may be any of a non-stretched film, a uniaxially stretched film, and a biaxially stretched film.

The thickness of the support substrate is not particularly limited. From the standpoint of preventing the PSA sheet from becoming excessively thick, the thickness of the support substrate can be, for example, about 200 μm or less (for example, about 100 μm or less). The thickness of the support substrate may be about 70 μm or less, about 30 μm or less, and about 10 μm or less (for example, about 5 μm or less) according to the purpose of use and the mode of use of the PSA sheet. The lower limit of the thickness of the support substrate is not particularly limited. From the standpoints of handleability (handling property), workability of the PSA sheet, and the like, the thickness of the support substrate is usually suitably about 2 μm or more, preferably about 5 μm or more, for example, about 10 μm or more.

Conventionally known surface treatment such as corona discharge treatment, plasma treatment, ultraviolet irradiation treatment, acid treatment, alkali treatment, and application of an undercoating agent may be implemented on the surface of the support substrate. Such a surface treatment can be a treatment for improving the adhesiveness between the support substrate and the PSA layer, in other words, for improving the anchoring property of the PSA layer to the support substrate.

<Release Liner>

In the art disclosed herein, a release liner can be used in formation of the PSA layer, preparation of the PSA sheet, and storage, distribution, processing, and the like of the PSA sheet before use. The release liner is not particularly limited, and examples thereof include a release liner having a release-treated layer on the surface of a liner substrate such as a resin film or paper, and a release liner composed of a material with low adhesivity such as a fluoropolymer (polytetrafluoroethylene and the like) or a polyolefin resin (polyethylene, polypropylene, and the like). The release-treated layer can be formed, for example, by surface-treating the liner substrate with a release treatment agent such as a silicone-based, long-chain alkyl-based, fluorine-based agent, or molybdenum sulfide.

<PSA Sheet>

The total thickness of the PSA sheet disclosed herein (including a PSA layer and further including a support substrate in a configuration having a support substrate, but not including a release liner) is not particularly limited. The total thickness of the PSA sheet can be, for example, about 300 μm or less. From the standpoint of thickness reduction, a suitable thickness is usually about 200 μm or less, and the thickness may be about 100 μm or less (for example, about 70 μm or less). Although the lower limit of the thickness of the PSA sheet is not particularly limited, a suitable thickness is usually about 4 μm or more, and the thickness is preferably about 6 μm or more, and more preferably about 10 μm or more (for example, about 15 μm or more). In a substrate-free PSA sheet, the thickness of the PSA layer is the thickness of the PSA sheet.

The PSA sheet disclosed herein may exhibit an impact adhesive strength of 0.25 mJ/cm$^2$ or more in an impact adhesive strength test conducted by a method described in Examples hereinbelow. Such a PSA sheet can be a joining means excellent in durability against impacts in the shear direction. Therefore, the PSA sheet can be preferably used, for example, as a member fixing means in a mobile electronic device which is supposed to be exposed to impacts caused by dropping or collision. With the art disclosed herein, it is possible to provide a PSA sheet exhibiting a shear impact resistance represented by an impact adhesive strength of 0.30 mJ/cm$^2$ or more (more preferably 0.35 mJ/cm$^2$ or more, for example, 0.40 mJ/cm$^2$ or more). The upper limit of impact adhesive strength is not particularly limited, and may be, for example, 1.00 mJ/cm$^2$ or less. From the standpoint of easily achieving compatibility with other characteristics (for example, heat-resistant holding power) at a higher level, the impact adhesive strength may be, for example, 0.70 mJ/cm$^2$ or less, 0.60 mJ/cm$^2$ or less, or 0.50 mJ/cm$^2$ or less.

The impact adhesive strength can be adjusted by, for example, the composition of the monomeric components constituting the base polymer (for example, the amount used of the carboxy group-containing monomer, and the presence or absence and the amount used of the functional group-containing monomer), and the amount of the crosslinking agent used.

It is preferable that the PSA sheet disclosed herein exhibit a heat-resistant cohesiveness at a level of holding for 1 h or more in a high-temperature holding power test conducted by a method described in Examples hereinbelow. Such a PSA sheet can be used for fixing a member, and the fixing position of the member can be maintained with high accuracy. For example, even when the PSA sheet is used in an embodiment in which the member is fixed in a product that can be placed in a high-temperature environment or in a product to which a stress can be applied in a shear direction for a long time, the displacement of the member can be effectively suppressed. Therefore, the PSA sheet is suitable for use for fixing a member (for example, a sensor) in a mobile electronic device for which the improvement of assembling accuracy and position accuracy is desirable from the standpoints of miniaturization and high-level integration. Fixing of a pressure-sensitive sensor for a touch panel which requires high positional accuracy is an example of a preferable application of the PSA sheet disclosed herein. In a preferred embodiment of the art disclosed herein, it is possible to provide a PSA sheet exhibiting heat-resistant cohesiveness at a level such that the displacement after 1 hour in the high-temperature holding power test is 1 mm or less (more preferably 0.70 mm or less, and even more preferably 0.50 mm or less).

In the PSA sheet disclosed herein, the time until the discoloration of a copper sheet is visually observed under conditions of 65° C. and 90% RH in a corrosion test conducted by the method described in Examples hereinbelow is preferably 200 hours or more, and more preferably 500 hours or more. A PSA sheet having such a metal corrosion prevention property can be used for fixing a member of an electronic device. Such an electronic device can be, for example, a substrate on which a conductive circuit pattern made of copper or the like is printed on a surface, or an electronic component such as a pressure-sensitive sensor in which the substrate is provided in at least a part thereof.

In the PSA sheet disclosed herein, a room-temperature peel strength with respect to polyethylene terephthalate (PET), that is, a 180-degree peel strength measured at room temperature (23° C.) by using PET as an adherend (hereinafter also referred to as "room-temperature peel strength with respect to PET") is preferably 15 N/25 mm or more (more preferably 17 N/25 mm or more, for example, 19 N/25 mm or more). Such a PSA sheet is suitable for fixing a member having a surface made of a resin material such as PET or a polyimide at least in part thereof. Although the upper limit of the room-temperature peel strength with respect to PET is not particularly limited, it may be, for example, 40 N/25 mm or less, or may be 30 N/25 mm or less from the standpoint of easily achieving compatibility with satisfactory heat-resistant cohesiveness.

The room-temperature peel strength with respect to PET can be measured in the following manner. Specifically, a PET film having a thickness of 50 μm (product name LUMIRROR S10 available from Toray Industries, Inc.) fixed on a stainless steel plate with a double-faced adhesive tape is used as an adherend. A measurement sample obtained by cutting the adhesive sheet into a size of 25 mm in width and 100 mm in length is prepared and the adhesive face of the measurement sample is press-bonded on the surface of the adherend (the surface of the PET film) with a 2 kg roller moving back and forth once under an environment of 23° C. and 50% RH. The sample is then allowed to stand for 30 min under the same environment, and the peel strength (N/25 mm) is measured based on JIS Z 0237:2009 by using a universal tensile compression tester under the conditions of a tensile speed of 300 mm/min and a peeling angle of 180 degrees. For example, "TENSILE COMPRESSION TESTER, TG-1 kN" available from Minebea Co., Ltd. can be used as the universal tensile compression tester. In the case of a substrate-free double-faced PSA sheet, a measurement sample may be prepared by attaching a suitable resin film as a backing film to one adhesive face (the surface opposite to the adhesive face which is the measurement object) of the PSA sheet, and then cutting the backed-up PSA sheet to the abovementioned size. As the backing film, for example, product name LUMIRROR S10, available from Toray Industries, Inc. may be used. This also applies to the Examples described hereinbelow.

<Applications>

The PSA sheet disclosed herein can be preferably used for fixing members typically in the form of a double-faced PSA sheet. The double-faced PSA sheet may be either a substrate-free PSA sheet or a substrate-supported PSA sheet. From the standpoint of thickness reduction, in one embodiment, a substrate-free double-faced PSA may be preferred.

The PSA sheet disclosed herein is suitable, for example, for fixing members in mobile electronic devices. Non-limiting examples of the mobile electronic devices include a cellular phone, a smartphone, a tablet type personal computer, a notebook type personal computer, various wearable devices (for example, wrist wearable devices such as a wrist watch, modular devices worn on part of a body with a clip, a strap, or the like, eyewear type devices inclusive of eyeglasses type devices (monocular and binocular type; including head-mounted device), devices attached to clothing, for example, in the form of an accessory on a shirt, a sock, a hat, or the like, earwear type devices which are attached to the ear, such as an earphone), a digital camera, a digital video camera, an acoustic device (a mobile music player, an IC recorder, and the like), a calculator (electronic calculator and the like), a mobile game machine, an electronic dictionary, an electronic notebook, an e-book reader, an information device for an automobile, a mobile radio, a mobile television, a mobile printer, a mobile scanner, and a mobile modem. The PSA sheet disclosed herein can be preferably used, for example, for the purpose of fixing a pressure-sensitive sensor and other members in those mobile electronic devices, among the abovementioned mobile electronic devices, that include a pressure-sensitive sensor. In one preferred embodiment, the PSA sheet can be used for fixing a pressure-sensitive sensor and other members in an electronic device (typically, a mobile electronic device) having a function of enabling the designation of an absolute position on a plate corresponding to the screen (typically, a touch panel) in an apparatus for indicating the position on a screen (typically, a pen type or a mouse type apparatus) and an apparatus for detecting the position. The term "mobile" in this description means not just providing simple mobility, but further providing a level of portability that allows an individual (average adult) to carry it relatively easily.

The PSA sheet disclosed herein can be preferably used, for example, for fixing a pressure-sensitive sensor (inclusive of those referred to as a force touch sensor). Thus, it can be preferably used in an embodiment in which one adhesive face of the PSA sheet is attached to the pressure-sensitive sensor. Such a pressure-sensitive sensor can be a member of a mobile electronic device. A preferable pressure-sensitive sensor to be the object of attachment (adherend) can be exemplified by a pressure-sensitive sensor for a touch panel. For example, the PSA sheet disclosed herein can be preferably used for fixing a pressure-sensitive sensor for a touch panel capable of identifying the strength by which the panel is pressed with a finger or the like and responding thereto. Such a pressure-sensitive sensor can be configured to include, for example, one or a plurality of capacitor plates and distinguish between a simple touch (touch) and pressure application (push) by using the fact that where the display surface (for example, a glass surface) of the touch panel is pressed with a finger, the distance between the touch panel and the capacitor plate is reduced. Such a pressure-sensitive sensor is preferably disposed on the rear side of a display module (for example, in a mobile electronic device including a liquid crystal panel, typically, on the backside of the backlight). In one embodiment, the sensor can be disposed on the backmost side of the display panel. Typically, a pressure-sensitive sensor to be attached is provided at least in part with a flexible printed circuit board (FPC). The FPC has a layer (insulating layer) made of an electrical insulator, and a circuit pattern is formed with a conductive material (typically, copper or a copper alloy) on the surface of this insulating layer. The FPC may be further provided with a conductive or insulating layer according to required performance and function. Such an FPC may have a multilayer structure in which a plurality of circuit boards is stacked. As used in this description, the term "multilayer structure" refers to a structure including two or more layers. The PSA sheet disclosed herein is typically attached to the back surface (the surface opposite to the surface where the circuit pattern is formed) of the FPC constituting the pressure-sensitive sensor. More specifically, the PSA sheet is attached to the insulating layer constituting the back surface of the pressure-sensitive sensor.

The insulating material constituting the insulating layer as described above is not particularly limited. Preferred examples thereof include resin materials (typically, plastic materials) such as a polyimide resin, an acrylic resin, a polyether nitrile resin, a polyether sulfone resin, a polyester resin (a polyethylene terephthalate resin, a polyethylene naphthalate resin, and the like), a polyvinyl chloride resin, a polyphenylene sulfide resin, a polyether ether ketone resin, a polyamide resin (the so-called aramid resin and the like), a polyarylate resin, a polycarbonate resin, and a liquid crystal polymer. Among others, a polyimide resin excellent in heat resistance is preferably used as a constituent material of an insulating layer for a pressure-sensitive sensor, and it is desirable that the PSA sheet to be used for this application exhibit satisfactory adhesiveness to the polyimide resin. Various types of surface treatment (for example, corona discharge treatment, plasma treatment, surface roughening treatment, and hydrolysis treatment) can be applied to the surface of the insulating layer to ensure adhesion with the PSA sheet. The thickness of the insulating layer as a constituent element of the pressure-sensitive sensor is not particularly limited but is suitably about 2 μm or more and usually 4 μm or more (typically 8 μm or more, for example, 15 μm or more). The upper limit of the insulating layer is not particularly limited, and is normally suitably about 120 μm or less (typically 40 μm or less, for example, 25 μm or less). A circuit pattern (typically, a metal pattern of copper or the like) can be formed on the surface of the insulating layer by suitably using and modifying a known method, and the circuit pattern does not particularly characterize the present invention. Therefore, detailed description thereof is herein omitted.

The other adhesive face of the PSA sheet (the adhesive face located on the opposite side to the adhesive face for fixing the pressure-sensitive sensor) is attached to various objects (for example, members). Typically, it is attached to constituent members of various electronic devices. Thus, the other adhesive face of the PSA sheet disclosed herein can be attached to a casing, a motor, a substrate, or a cover of a mobile electronic device such as a mobile phone, a smartphone, or a tablet type personal computer, or to a back surface member such as an electromagnetic shield or a reinforcing plate disposed on the back surface of the FPC, but these examples are not limiting. Since the PSA sheet disclosed herein can exhibit a satisfactory bonding function even when the thickness thereof is small, the PSA sheet can be preferably used for mobile electronic device applications where the demand for miniaturization and space saving is strong.

Materials constituting the object to be fixed of the pressure-sensitive sensor (for example, a back surface member for an electromagnetic shield or a reinforcing plate) are not particularly limited. Non-limiting examples thereof include metal materials such as copper, silver, gold, iron, tin, palladium, aluminum, nickel, titanium, chromium, zinc, and the like, or alloys including two or more thereof, various resin materials exemplified as the constituting materials of the insulating layer, and inorganic materials such as alumina, zirconia, soda glass, quartz glass, and carbon. Among them, metal materials such as copper, aluminum, and stainless steel, and resin materials (typically plastic materials) such as polyimide resins, aramid resins, and polyphenylene sulfide resins are widely used. The fixing object may be in a single layer structure or a multilayer structure, and the surface thereof (attachment surface) which is to be attached to the PSA sheet may be subjected to various types of surface treatment. A fixed object can be exemplified by a back surface member having a thickness of about 1 µm or more (typically, 5 µm or more, for example, 60 µm or more, and also 120 µm or more) and about 1500 µm or less (for example, 800 µm or less), but these values are not particularly limiting.

The PSA sheet disclosed herein is preferably used in an embodiment in which one adhesive face thereof is bonded to a pressure-sensitive sensor and the other adhesive face is attached to an object (for example, another member constituting a mobile electronic device). In this mode of use, the PSA sheet attached to the pressure-sensitive sensor functions as a PSA layer in the laminate structure with the pressure-sensitive sensor. In such a pressure-sensitive sensor equipped with the PSA layer, the other adhesive face located on the side opposite to the pressure-sensitive sensor side may be protected by a release liner. The release liner is removed from the other adhesive face at the time of attachment to a part which is the object to be fixed of the pressure-sensitive sensor. Alternatively, in another embodiment, the PSA sheet is used by attaching the other adhesive face to the part (object to be fixed of the pressure-sensitive sensor, for example, a member), and then attaching the one adhesive face to the pressure-sensitive sensor. In that case, the one adhesive face of the PSA sheet (also considered as a PSA layer) affixed to the part may be protected by the release liner before being attached to the pressure-sensitive sensor. After the pressure-sensitive sensor has been fixed to the part by using the PSA sheet, an electronic device (typically, a mobile electronic device) having a stacked structure including the part (for example, a member), the pressure-sensitive sensor, and the PSA layer that joins together the part and the pressure-sensitive sensor can be obtained.

The matters disclosed by this description include the following.

(1) A PSA sheet including a PSA layer, wherein
the PSA layer is formed from a PSA composition including a base polymer, crosslinking agents of two or more species having mutually different types of crosslinkable functional groups, and an azole-based rust inhibitor;
one of the crosslinking agents of two or more species is an isocyanate-based crosslinking agent;
monomeric components constituting the base polymer comprise a carboxy group-containing monomer; and
an amount of the azole-based rust inhibitor in the PSA layer is less than 8 parts by weight with respect to 100 parts by weight of the base polymer.

(2) The PSA sheet according to (1) above, wherein the PSA layer has a relative dielectric constant of about 3 or more (for example, about 3 or more and about 6 or less) at 300 kHz.

(3) The PSA sheet according to (1) or (2) above, wherein the monomeric components constituting the base polymer comprise a $C_{1-4}$ alkyl (meth)acrylate at about 50% by weight or more (for example, about 70% by weight or more, or about 90% by weight or more, and typically about 99%/o by weight or less) of the monomeric components.

(4) The PSA sheet according to any of (1) to (3) above, wherein an amount of the carboxy group-containing monomer among the monomeric components is more than about 3% by weight (for example, about 3.5% by weight or more, or about 4% by weight or more, and typically about 15% by weight or less, for example, less than 7% by weight).

(5) The PSA sheet according to any of (1) to (4) above, wherein the amount of the azole-based rust inhibitor is about 0.2 part by weight or more (for example, about 0.5 part by weight or more) and about 15 parts by weight or less (for example, 10 parts by weight or less, or about 5 parts by weight or less) with respect to 10 parts by weight of the carboxy group-containing monomer.

(6) The PSA sheet according to any of (1) to (5) above, wherein the azole-based rust inhibitor includes a benzotriazole compound of at least one kind selected from the group consisting of 1,2,3-benzotriazole, 5-methylbenzotriazole, 4-methylbenzotriazole, and carboxybenzotriazole.

(7) The PSA sheet according to any of (1) to (6) above, wherein the PSA layer includes a tackifier resin.

(8) The PSA sheet according to (7) above, wherein the amount of the tackifier resin is about 10 parts by weight or more and about 50 parts by weight or less with respect to 100 parts by weight of the base polymer.

(9) The PSA sheet according to (7) or (8) above, comprising a tackifier resin having a hydroxyl value of about 30 mg KOH/g or more as the tackifier resin.

(10) The PSA sheet according to any of (7) to (9) above, comprising a tackifier resin having a hydroxyl value of about 70 mg KOH/g or more as the tackifier resin.

(11) The PSA sheet according to any of (7) to (10) above, comprising a terpene phenolic resin as the tackifier resin.

(12) The PSA sheet according to (7) above, wherein the PSA layer includes a terpene phenolic resin with a hydroxyl value of about 30 mg KOH/g to 65 mg KOH/g in an amount of about 10 parts by weight to 50 parts by weight with respect to 100 parts by weight of the base polymer.

(13) The PSA sheet according to (7) above, wherein the PSA layer includes a terpene phenolic resin with a hydroxyl value of about 70 mg KOH/g to 150 mg KOH/g in an amount of about 10 parts by weight to 50 parts by weight with respect to 100 parts by weight of the base polymer.

(14) The PSA sheet according to any of (1) to (13) above, wherein a room-temperature peel strength with respect to PET is about 15 N/25 mm or more (for example, about 17 N/25 mm or more, and typically about 40 N/25 mm or less, for example, about 30 N/25 mm or less).

(15) The PSA sheet according to any of (1) to (14) above, wherein a room-temperature peel strength with respect to aluminum is about 15 N/25 mm or more (for example, about 17 N/25 mm or more, and typically about 40 N/25 mm or less, for example, about 30 N/25 mm or less).

(16) The PSA sheet according to any of (1) to (15) above, wherein a heat-resistant peel strength with respect to PET is about 7 N/25 mm or more (for example, about 9 N/25 mm or more, and typically about 30 N/25 mm or less).

(17) The PSA sheet according to any of (1) to (16) above, wherein a heat-resistant peel strength with respect to aluminum is about 5 N/25 mm or more (for example, about 10 N/25 mm or more, and typically about 30 N/25 mm or less, for example about 20 N/25 mm or less).

(18) The PSA sheet according to any of (1) to (17) above, wherein an impact adhesive strength is about 0.30 mJ/cm$^2$ or more (for example, about 0.40 mJ/cm$^2$ or more, and typically about 1.00 mJ/cm$^2$ or less, for example, about 0.70 mJ/cm$^2$ or less).

(19) The PSA sheet according to any of (1) to (18) above, wherein a displacement distance in the high-temperature holding force test described in the examples is about 1 mm or less (for example, about 0.5 mm or less).

(20) The PSA sheet according to any of (1) to (19) above, wherein the amount of the isocyanate-based crosslinking agent in the PSA composition is about 0.5 part by weight or more and about 10 parts by weight or less with respect to 100 parts by weight of the base polymer.

(21) The PSA sheet according to any of (1) to (20) above, wherein among the crosslinking agents of two or more species, one kind other than the isocyanate-based crosslinking agent is a non-isocyanate-based crosslinking agent of at least one kind selected from the group consisting of an epoxy-based crosslinking agent, an oxazoline-based crosslinking agent, an aziridine-based crosslinking agent, a melamine-based crosslinking agent, a carbodiimide-based crosslinking agent, a hydrazine-based crosslinking agent, an amine-based crosslinking agent, a peroxide-based crosslinking agent, a metal chelate-based crosslinking agent, a metal alkoxide-based crosslinking agent, a metal salt-based crosslinking agent, and a silane coupling agent.

(22) The PSA sheet according to (21) above, wherein the non-isocyanate-based crosslinking agent includes an epoxy-based crosslinking agent.

(23) The PSA sheet according to (21) or (22) above, wherein the amount of the non-isocyanate-based crosslinking agent (for example, an epoxy-based crosslinking agent) in the PSA composition is about $\frac{1}{1000}$ or more and about $\frac{1}{50}$ or less, on the weight basis, of the amount of the isocyanate-based crosslinking agent.

(24) The PSA sheet according to any of (1) to (23) above, wherein the thickness of the PSA layer is about 10 μm or more and about 50 μm or less.

(25) The PSA sheet according to any of (1) to (24) above, which is configured as a substrate-free double-faced PSA sheet.

(26) A PSA sheet including a PSA layer, wherein
the PSA layer is formed from a PSA composition including a base polymer, crosslinking agents of two or more species having mutually different types of crosslinkable functional groups, an azole-based rust inhibitor, and a tackifier resin;
monomeric components constituting the base polymer include a $C_{1-4}$ alkyl (meth)acrylate at 70% by weight or more of the monomeric components;
the monomeric components constituting the base polymer include a carboxy group-containing monomer at 3.5% by weight or more and 10% by weight or less of the monomeric component;
the amount of the azole-based rust inhibitor in the PSA layer is 0.5 parts by weight or more and 6 parts by weight or less with respect to 100 parts by weight of the base polymer;
the crosslinking agents of two or more species include an isocyanate-based crosslinking agent and an epoxy-based crosslinking agent;
the amount of the isocyanate-based crosslinking agent in the PSA composition is 0.5 parts by weight or more and 10 parts by weight or less with respect to 100 parts by weight of the base polymer;
the amount of the epoxy-based crosslinking agent in the PSA composition is $\frac{1}{1000}$ or more and $\frac{1}{100}$ or less of the amount of the isocyanate-based crosslinking agent; and
the amount of the tackifier resin is 10 parts by weight or more and 50 parts by weight or less with respect to 100 parts by weight of the base polymer.

(27) The PSA sheet according to any of (1) to (26) above, which is used for fixing a member in a mobile electronic device.

(28) The PSA sheet according to (27) above, wherein the member is a pressure-sensitive sensor (for example, a pressure-sensitive sensor of an electrostatic capacitive type or a pressure-sensitive sensor of a resistive type).

(29) A mobile electronic device having a laminated structure including a pressure-sensitive sensor (for example, a pressure-sensitive sensor of an electrostatic capacitive type or a resistive type), another member constituting the mobile electronic device, and a PSA sheet joining the pressure-sensitive sensor and the other member, wherein
the PSA sheet is a PSA sheet according to any of (1) to (26) above.

EXAMPLES

Several examples relating to the present invention will be described hereinbelow, but the present invention is not intended to be limited to those examples. In the description below, "parts" and "%" are based on weight unless otherwise specified.

Preparation of PSA Sheet

Example 1

To a reaction vessel equipped with a stirrer, thermometer, nitrogen gas inlet, reflux condenser and addition funnel, were placed 95 parts of BA and 5 parts of AA as monomeric components and 233 parts of ethyl acetate as a polymerization solvent, followed by stirring for 2 hours while introducing nitrogen gas. After oxygen in the polymerization system was thus removed, 0.2 part of 2,2'-azobisisobutyronitrile was added as a polymerization initiator, and solution polymerization was implemented for 8 hours at 60° C. to obtain a solution of an acrylic polymer. The Mw of the acrylic polymer was about $70 \times 10^4$.

To this solution, were added 0.8 part of 1,2,3-benzotriazole (product name BT-120 available from Johoku Chemical Co., Ltd.), 20 parts of a terpene phenolic resin (product name YS POLYSTAR T-115, a softening point of about 115° C., a hydroxyl value of 30 mg KOH/g to 60 mg KOH/g, available from Yasuhara Chemical Co., Ltd., hereinafter referred to as "tackifier resin A") as a tackifier resin, and 2 parts of an isocyanate-based crosslinking agent (product name CORONATE L, a 75% ethyl acetate solution of a trimethylolpropane/tolylene diisocyanate trimer adduct, available from Tosoh Corporation) and 0.01 part of an epoxy-based crosslinking agent (product name TETRAD-C, 1,3-bis(N,N-diglycidylaminomethyl)cyclohexane, available from Mitsubishi Gas Chemical Co., Inc.) as crosslinking agents with respect to 100 parts of the acrylic polymer contained in the solution, and stirring and mixing were performed to prepare a PSA composition.

The PSA composition was applied to the release surface of a polyester release liner (product name DIAFOIL MRF available from Mitsubishi Polyester Film Inc.) having a thickness of 38 μm and dried for 2 min at 100° C. to form a PSA layer having a thickness of 25 μm. The release surface of a polyester release liner (product name DIAFOIL MRF, thickness 25 μm, available from Mitsubishi Polyester Film Inc.) having a thickness of 25 μm was attached to the PSA layer. In this manner, a substrate-free double-faced PSA sheet having a thickness of 25 μm and protected at each surface with the polyester release liner was obtained.

Examples 2 to 8

The types and amounts used of the monomeric components, tackifier resin, rust inhibitor and crosslinking agent in the preparation of the PSA composition according to Example 1 were set as shown in Table 1. In other aspects, PSA compositions according to Examples 2 to 8 were prepared in the same manner as in Example 1, and substrate-free double-faced PSA sheets were produced using the PSA compositions.

The "Tackifier resin B" in Table 1 is a product name YS POLYSTAR S-145 (terpene phenolic resin, a softening point of about 145° C., a hydroxyl value of 70 KOH/g to 110 mg KOH/g) available from Yasuhara Chemical Co., Ltd.

Example 9

To a monomer mixture consisting of 66 parts of 2EHA, 15 parts of N-vinyl-2-pyrrolidone (NVP), and 18 parts of 2-hydroxyethyl acrylate (HEA), was added 0.07 part of a photopolymerization initiator (product names IRGACURE 184 and IRGACURE 651 both available from BASF were used at a weight ratio of 1:1), followed by irradiating with ultraviolet rays until the viscosity reached about 20 Pa·s, thereby obtaining a prepolymer composition in which the monomeric components in the monomer mixture were partially polymerized. To 100 parts of the prepolymer composition, were added 10 parts of a low polymer of dicyclopentanyl methacrylate (DCPMA) and methyl methacrylate (MMA) (copolymer composition: DCPMA/MMA=60/40), 0.25 part of hexanediol diacrylate (HDDA), 0.3 part of a silane coupling agent (product name KBM-403 available from Shin-Etsu Chemical Co., Ltd.), and 0.2 part of 1,2,3-benzotriazole (product name BT-120 available from Johoku Chemical Co., Ltd.), and mixed therewith to obtain a PSA composition (composition before curing).

The PSA composition was applied onto a release liner made of polyethylene terephthalate (PET) (product name MRF 50 available from Mitsubishi Plastics, Inc.) so that the final thickness (thickness of the PSA layer) was 25 μm. The coating layer was covered with a PET release liner (product name MRF 38 available from Mitsubishi Plastics, Inc.) to block oxygen, and then cured by irradiation with ultraviolet rays having an illuminance of 5 mW/cm² for 300 sec to obtain a substrate-free double-faced PSA sheet having a thickness of 25 μm and protected at each surface with the release liner.

Examples 10 and 11

The types and amounts used of the rust inhibitor and crosslinking agent in the preparation of the PSA composition according to Example 1 were set as shown in Table 1. In Example 10, a black pigment of an amount shown in Table 1 (product name ATDN 101 BLACK available from Dainichiseika Color & Chemicals Mfg Co., Ltd.) was additionally used. In other aspects, the PSA compositions according to Examples 10 and 11 were prepared in the same manner as in Example 1, and substrate-free double-faced PSA sheets were produced using the PSA compositions.

After curing the obtained double-faced PSA sheets for 1 day under an environment of 23° C. and 50% RH, the following evaluation tests were performed on the double-faced PSA sheets.

Example 12

In preparation of the PSA composition according to Example 1, was used 2 parts of an oxazoline-based crosslinking agent (trade name "WS-500" manufactured by Nippon Shokubai Co., Ltd., nonvolatile content 39% by weight) in place of the epoxy-based crosslinking agent. In other aspects, the PSA composition according to Example 12 was prepared in the same manner as in Example 1, and substrate-free double-faced PSA sheet was produced using the PSA composition.

<Evaluation Tests>

[Measurement of Peel Strength with Respect to PET]

Under a measurement environment of 23° C. and 50% RH, a PET film having a thickness of 50 μm was attached as a backing film to one adhesive face of a double-faced PSA sheet followed by cutting to a size of 25 mm in width and 100 mm in length to prepare a measurement sample. The room-temperature peel strength with respect to PET (N/25 mm) was measured by the above-described method with respect to the other adhesive face of the measurement sample.

Further, the measurement sample was attached to an adherend (the surface of the PET film) in the same manner as in the measurement of the room-temperature peel strength with respect to PET under the environment of 23° C. and 50% RH, and then a heat-resistant peel strength with respect to PET (N/25 mm) was measured under the conditions of a tensile speed of 300 mm/min and a peeling angle of 180 degrees in a measurement environment at 85° C. The results are shown in Table 1.

[Measurement of Peel Strength with Respect to Aluminum]

The room-temperature peel strength with respect to aluminum and heat-resistant peel strength with respect to aluminum were measured in the same manner as the peel strength with respect to PET, except that an aluminum plate having a thickness of 3 mm was used as the adherend. The results are shown in Table 1.

[Measurement of Impact Adhesive Strength]

The impact adhesive strength was measured using a pendulum type shear impact tester based on JIS K6855 (corresponds to international standard ISO 9653). A test piece was prepared by press-bonding a square stainless steel (SUS 304) plate having a side of 10 mm and a thickness of 5 mm to another stainless steel (SUS 304) plate for 10 sec under a load of 35 N by using a PSA sheet piece obtained by cutting the substrate-free double-faced PSA sheet according to each example into a 10 mm square, and then curing for 48 hours at room temperature. The measurements were implemented under the conditions of a hammer energy of 2.75 J and a hammer speed (impact speed) of 3.5 m/sec.

[High-Temperature Holding Power]

The heat-resistant cohesiveness was evaluated by conducting a high-temperature holding power test under a temperature condition of 80° C. according to JIS Z 0237:2009. Specifically, under an environment of 23° C. and 50% RH, a PET film having a thickness of 50 μm was attached as a backing film to one adhesive face of a double-faced PSA sheet followed by cutting to a size of 10 mm in width to prepare a measurement sample. The other adhesive face of the measurement sample was attached to a bakelite plate as an adherend with a 2 kg roller moved back and forth once over a bonding area having a width of 10 mm and a length of 20 mm. The measurement sample attached to the adherend in this way was allowed to stand for 30 min in a suspended state in an environment of 80° C., and then a load of 1 kg was applied to the free end of the measurement sample. After allowing the sample to stand for 1 hour in an environment of 80° C. under the applied load, a displacement distance (mm) from the initial attachment position was measured with respect to the measurement sample. The tests were implemented using three measurement samples (namely, n=3) for the PSA sheet of each Example, and the arithmetic average value of these displacement distances is shown in Table 1. When even one of the three measurement samples peeled off from the adherend and dropped within 1 hour, "drop" was indicated in the column of heat-resistant cohesiveness in Table 1.

[Corrosion Test]

A transparent PET film having a thickness of 200 μm was attached as a backing film to one adhesive face of two double-faced PSA sheets, and the PSA sheets were attached to respective surfaces of a copper foil having a thickness of 25 μm, followed by cutting into a 10 mm square, thereby preparing a laminate sample having a structure of PET film/double-faced PSA sheet/copper foil/double-faced PSA sheet/PET film. This sample was stored under high-temperature and high-humidity conditions of 85° C. and 85% RH. The copper foil was visually observed through the PET film after 200 hours and 500 hours from the start of storage, and the presence or absence of changes in external appearance was evaluated on the following three-grade scale. The results are shown in Table 1.

E: no discoloration was observed in the observation after 500 hours (excellent corrosion prevention property);

G: although slight discoloration was observed at the corner portions of the sample after 500 hours of observation, no discoloration was observed in the observation after 200 hours (good corrosion inhibiting property); and P: obvious discoloration was observed in the observation after 200 hours (poor corrosion prevention property).

[Measurement of Relative Dielectric Constant]

A PSA layer (substrate-free double-faced PSA sheet) according to each example was sandwiched between a copper foil and an electrode, and the relative dielectric constant at a frequency of 300 kHz was measured with the following apparatus. Three samples were prepared for measurement, and the average of the measured values of these three samples was taken as the dielectric constant. The relative dielectric constant of the PSA layer at a frequency of 300 kHz was measured under the following conditions in accordance with JIS K 6911. The results are shown in Table 1.

Measurement method: capacitance method (apparatus: AGILENT TECHNOLOGIES E4980A PRECISION LCR METER)

Electrode: aluminum plate having a diameter 12.1 mm and a thickness of 0.5 mm

Counter electrode: 3 oz copper plate

Measurement environment: 23° C., 55% RH

TABLE 1

|  |  | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 |
|---|---|---|---|---|---|---|---|---|---|---|---|---|---|
| Monomer composition (parts by weight) | 2EHA | — | — | — | — | 95 | — | — | — | 66 | — | — | — |
|  | BA | 95 | 93 | 95 | 95 | — | 98 | 95 | 95 | — | 95 | 95 | 95 |
|  | AA | 5 | 7 | 5 | 5 | 5 | 2 | 5 | 5 | — | 5 | 5 | 5 |
|  | NVP | — | — | — | — | — | — | — | — | 15 | — | — | — |
|  | HEA | — | — | — | — | — | — | — | — | 18 | — | — | — |
| Rust inhibitor (parts by weight) | Benzotriazole | 0.8 | 0.8 | 0.2 | 4 | 0.8 | 0.8 | 4 | 8 | 0.2 | 0.8 | 6 | 0.8 |
| Pigment | ATDN 101 Black | — | — | — | — | — | — | — | — | 5 | — | — | — |
| Tackifier (parts by weight) | Tackifier resin A | 20 | 20 | 20 | 20 | — | 20 | 20 | 20 | — | 20 | 20 | 20 |
|  | Tackifier resin B | — | — | — | — | 20 | — | — | — | — | — | — | — |
|  | DCPMA/MMA copolymer | — | — | — | — | — | — | — | — | 18 | — | — | — |
| Crosslinking agent (parts by weight) | CORONATE L | 2 | 2 | 2 | 2 | 2 | 2 | — | 2 | — | 3 | 2 | 2 |
|  | TETRAD-C | 0.01 | 0.01 | 0.01 | 0.01 | 0.01 | 0.01 | 0.02 | 0.01 | — | 0.01 | 0.01 | — |
|  | HDDA | — | — | — | — | — | — | — | — | 0.25 | — | — | — |
|  | KBM-403 | — | — | — | — | — | — | — | — | 0.3 | — | — | — |
|  | WS-500 | — | — | — | — | — | — | — | — | — | — | — | 2 |
| Room-temperature peel strength 23° C. (N/25 mm) | PET | 19.9 | 17.3 | 19.5 | 23.5 | 23.6 | 14.3 | 18.9 | 24.1 | 14.3 | 15.6 | 23.7 | 18.9 |
|  | Aluminum | 17.8 | 18.2 | 17.4 | 19.7 | 18.8 | 14.8 | 20.7 | 17.7 | 16.0 | 17.1 | 18.1 | 16.7 |
| Heat-resistant peel strength 85° C. (N/25 mm) | PET | 9.0 | 9.8 | 8.8 | 13.6 | 10.0 | 5.8 | 13.7 | 18.6 | 6.3 | 8.8 | 15.1 | 11.7 |
|  | Aluminum | 10.5 | 7.8 | 10.2 | 13.3 | 7.1 | 4.2 | 10.5 | 13.4 | 5.9 | 10.9 | 12.5 | 11.0 |
| Impact adhesive strength (mJ/cm$^2$) |  | 0.48 | 0.38 | 0.48 | 0.68 | 0.42 | 0.35 | 0.66 | 0.64 | 0.20 | 0.89 | 0.65 | 0.56 |
| Heat-resistant cohesiveness 80° C. × 1 kg × 1 h (mm) |  | 0.4 | 0.2 | 0.4 | 0.75 | 0.65 | 0.5 | drop | drop | 0.3 | 0.3 | 0.85 | 0.3 |

TABLE 1-continued

|  | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 |
|---|---|---|---|---|---|---|---|---|---|---|---|---|
| Corrosion prevention property 80° C. × 85% RH | E | E | G | E | E | E | E | E | E | E | E | E |
| Relative dielectric constant 300 kHz | 3.26 | 3.37 | 3.19 | 3.35 | 2.50 | 2.81 | 3.37 | 3.39 | 3.41 | 3.71 | 3.38 | 3.21 |

As shown in Table 1, the PSA sheets of Examples 1 to 6, 10, 11 and 12 in which the base polymer of the PSA layer had a monomer composition including a carboxy group-containing monomer, and an isocyanate-based crosslinking agent was combined with another crosslinking agent in a composition including an azole-based rust inhibitor were superior in shear impact resistance to the PSA sheet according to Example 9 in which the base polymer of the PSA layer contained no carboxy group-containing monomer, and also had a heat resistant cohesiveness higher than that of the PSA sheets according to Examples 7 and 8 and good metal corrosion prevention property. Particularly satisfactory results were obtained with the PSA sheets according to Examples 1, 2, 4, 5, 10, 11 and 12.

Although specific embodiments of the present invention have been described in detail above, these are merely for illustrations and do not limit the scope of claims. The art according to the claims includes various modifications and changes made to the specific embodiments illustrated above.

The invention claimed is:

1. A pressure-sensitive adhesive sheet including a pressure-sensitive adhesive layer, wherein
   the pressure-sensitive adhesive layer is formed from a pressure-sensitive adhesive composition including a base polymer, crosslinking agents of two or more species having mutually different types of crosslinkable functional groups, and an azole-based rust inhibitor; wherein the pressure-sensitive adhesive layer has a relative dielectric constant of 3 or more at 300 kHz; and
   one of the crosslinking agents of two or more species is an isocyanate-based crosslinking agent;
   monomeric components constituting the base polymer comprise a carboxy group-containing monomer, an amount of the carboxy group-containing monomer among the monomeric components is 3.5% by weight or more and 10% by weight or less; and
   an amount of the azole-based rust inhibitor in the pressure-sensitive adhesive layer is less than 8 parts by weight with respect to 100 parts by weight of the base polymer, and 0.4 parts by weight or more and 12 parts by weight or less with respect to 10 parts by weight of the carboxy group-containing monomer included among the monomeric components constituting the base polymer.

2. The pressure-sensitive adhesive sheet according to claim 1, wherein the monomeric components constituting the base polymer comprise a (meth)acrylate having an alkyl group having 4 or less carbon atoms at an ester end at 50% by weight or more of the monomeric components.

3. The pressure-sensitive adhesive sheet according to claim 1, wherein the amount of the azole-based rust inhibitor in the pressure-sensitive adhesive layer is 1 part by weight or more and 3 parts by weight or less with respect to 10 parts by weight of the carboxy group-containing monomer included among the monomeric components constituting the base polymer.

4. The pressure-sensitive adhesive sheet according to claim 1, wherein the pressure-sensitive adhesive layer comprises a tackifier resin having a hydroxyl value of 30 mg KOH/g or more.

5. The pressure-sensitive adhesive sheet according to claim 1, wherein the pressure-sensitive adhesive layer comprises a terpene phenolic resin as a tackifier resin with a hydroxyl value of 30 to 65 mg KOH/g in an amount of 10 to 50 parts by weight with respect to 100 parts by weight of the base polymer.

6. The pressure-sensitive adhesive sheet according to claim 1, wherein the pressure-sensitive adhesive layer comprises a terpene phenolic resin as a tackifier resin with a hydroxyl value of 70 to 150 mg KOH/g in an amount of 10 to 50 parts by weight with respect to 100 parts by weight of the base polymer.

7. The pressure-sensitive adhesive sheet according to claim 1, wherein the azole-based rust inhibitor comprises a benzotriazole compound of at least one kind selected from the group consisting of 1,2,3-benzotriazole, 5-methylbenzotriazole, 4-methylbenzotriazole, and carboxybenzotriazole.

8. The pressure-sensitive adhesive sheet according to claim 1, wherein an amount of the isocyanate-based crosslinking agent in the pressure-sensitive adhesive composition is 1.5 part by weight or more and 10 parts by weight or less with respect to 100 parts by weight of the base polymer.

9. The pressure-sensitive adhesive sheet according to claim 1, wherein among the crosslinking agents of two or more species, one kind other than the isocyanate-based crosslinking agent is a non-isocyanate-based crosslinking agent of at least one kind selected from the group consisting of an epoxy-based crosslinking agent, an oxazoline-based crosslinking agent, an aziridine-based crosslinking agent, a melamine-based crosslinking agent, a carbodiimide-based crosslinking agent, a hydrazine-based crosslinking agent, an amine-based crosslinking agent, a peroxide-based crosslinking agent, a metal chelate-based crosslinking agent, a metal alkoxide-based crosslinking agent, a metal salt-based crosslinking agent, and a silane coupling agent.

10. The pressure-sensitive adhesive sheet according to claim 9, wherein
    the non-isocyanate-based crosslinking agent comprises an epoxy-based crosslinking agent; and
    the amount of the epoxy-based crosslinking agent in the pressure-sensitive adhesive composition is 0.001 part by weight or more and 0.5 part by weight or less with respect to 100 parts by weight of the base polymer.

11. The pressure-sensitive adhesive sheet according to claim 1, which is configured as a substrate-free double-faced pressure-sensitive adhesive sheet.

12. The pressure-sensitive adhesive sheet according to claim 1, wherein the monomeric components constituting the base polymer comprise a (meth)acrylate having an alkyl group having 1 to 4 carbon atoms at an ester end at 85% by weight or more of the monomeric components.

13. The pressure-sensitive adhesive sheet according to claim 1, wherein the monomeric components constituting the base polymer include an alkyl (meth)acrylate in an amount of 85% by weight or more of the monomeric components, and the alkyl (meth)acrylate is at least one monomer selected from the group consisting of methyl (meth)acrylate, ethyl (meth)acrylate, propyl (meth)acrylate, isopropyl (meth)acrylate, n-butyl (meth)acrylate, isobutyl (meth)acrylate, s-butyl (meth)acrylate, t-butyl (meth)acrylate, pentyl (meth)acrylate, isopentyl (meth)acrylate, hexyl (meth)acrylate, heptyl (meth)acrylate, 2-ethylhexyl (meth)acrylate, octyl (meth)acrylate, isooctyl (meth)acrylate, nonyl (meth)acrylate, and isononyl (meth)acrylate.

14. The pressure-sensitive adhesive sheet according to claim 1, a functional group-containing monomer is not included in the monomeric components constituting the base polymer, or the functional group-containing monomer is included in an amount of 10% by weight or less of the monomeric components constituting the base polymer.

15. The pressure-sensitive adhesive sheet according to claim 1, wherein the monomeric components constituting the base polymer do not include a functional group-containing monomer, or include the functional group-containing monomer in an amount of 10% by weight or less of the monomeric components, and the functional group-containing monomer is at least one monomer selected from the group consisting of hydroxyl group-containing monomers, amide group-containing monomers, amino group-containing monomers, monomers having an epoxy group, cyano group-containing monomers, keto group-containing monomers, monomers having a nitrogen atom-containing ring, and alkoxysilyl group-containing monomers.

16. The pressure-sensitive adhesive sheet according to claim 1, wherein the azole-based rust inhibitor is a compound having a structure represented by the following formula (2):

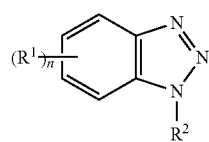

(2)

wherein, $R_1$ is a substituent on the benzene ring, and $R_1$ is selected from an alkyl group having 1 to 6 carbon atoms, an alkoxy group having 1 to 6 carbon atoms, an aryl group having 6 to 14 carbon atoms, a carboxy group, a carboxyalkyl group having 2 to 6 carbon atoms, an amino group, a mono- or di-$C_{1-10}$ alkylamino group, an amino-$C_{1-6}$ alkyl group, a mono- or di-$C_{1-10}$ alkylamino-$C_{1-6}$ alkyl group, a mercapto group, and an alkoxycarbonyl group having 1 to 6 carbon atoms; n is an integer of 0 to 4, and when n is 2 or more, the n substituents $R_1$ may be the same or different; $R_2$ is selected from a hydrogen atom, an alkyl group having 1 to 12 carbon atoms, an alkoxy group having 1 to 12 carbon atoms, an aryl group having 6 to 14 carbon atoms, an amino group, a mono- or di-$C_{1-10}$ alkylamino group, an amino-$C_{1-6}$ alkyl group, a mono- or di-$C_{1-10}$ alkylamino-$C_{1-6}$ alkyl group, a mercapto group, and an alkoxycarbonyl group having 1 to 12 carbon atoms; $R_1$ and $R_2$ may be the same or different.

17. The pressure-sensitive adhesive sheet according to claim 1, exhibiting properties (1) and (2):
(1) a heat-resistant cohesiveness at a level of holding for one hour or more in a high-temperature holding power test under a temperature condition of 80° C. according to JIS Z 0237:2009; and
(2) a time of 200 hours or more until discoloration of a copper sheet that is visually observed under conditions of 65° C. and 90% relative humidity (RH) in a corrosion test conducted by a method comprising:
(i) attaching the pressure-sensitive adhesive sheet to surfaces of a copper foil having a thickness of 25 μm,
(ii) cutting the attached pressure-sensitive adhesive sheet to the surfaces of the copper foil into a 10 mm square, thereby preparing a laminate sample,
(iii) storing the laminate sample at temperature of 85° C. and 85% RH, and
(iv) visually observing the discoloration of the copper foil in the stored laminate sample after 200 hours or more from start of storage of the laminate sample.

18. A mobile electronic device including a pressure sensitive sensor, a member formed of a metal material, and the pressure-sensitive adhesive sheet according to claim 1, wherein the pressure-sensitive adhesive sheet fixes the pressure sensitive sensor to the member.

19. A pressure-sensitive adhesive sheet including a pressure-sensitive adhesive layer, wherein
the pressure-sensitive adhesive layer is formed from a pressure-sensitive adhesive composition including a base polymer, crosslinking agents of two or more species having mutually different types of crosslinkable functional groups, an azole-based rust inhibitor, and a tackifier resin; wherein the pressure-sensitive adhesive layer has a relative dielectric constant of 3 or more at 300 kHz; and
monomeric components constituting the base polymer comprise a (meth)acrylate having an alkyl group having 1 to 4 carbon atoms at an ester end at 70% by weight or more of the monomeric components;
the monomeric components constituting the base polymer comprise a carboxy group-containing monomer at 3.5% by weight or more and 10% by weight or less of the monomeric component;
an amount of the azole-based rust inhibitor in the pressure-sensitive adhesive layer is less than 8 parts by weight with respect to 100 parts by weight of the base polymer, and 0.4 parts by weight or more and 12 parts by weight or less with respect to 10 parts by weight of the carboxy group-containing monomer included among the monomeric components constituting the base polymer;
an amount of the tackifier resin in the pressure-sensitive adhesive layer is 10 parts by weight or more and 50 parts by weight or less with respect to 100 parts by weight of the base polymer;
the crosslinking agents of two or more species comprise an isocyanate-based crosslinking agent and an epoxy-based crosslinking agent;
an amount of the isocyanate-based crosslinking agent in the pressure-sensitive adhesive composition is 0.5 part by weight or more and 10 parts by weight or less with respect to 100 parts by weight of the base polymer; and
an amount of the epoxy-based crosslinking agent in the pressure-sensitive adhesive composition is $\frac{1}{1000}$ or more and $\frac{1}{100}$ or less of the amount of the isocyanate-based crosslinking agent.

* * * * *